US012641340B2

(12) United States Patent
Kim et al.

(10) Patent No.: US 12,641,340 B2
(45) Date of Patent: May 26, 2026

(54) CAMERA USING PIEZOELECTRIC ACTUATOR AND CAMERA DEVICE COMPRISING SAME

(71) Applicant: LG INNOTEK CO., LTD., Seoul (KR)

(72) Inventors: Min Seong Kim, Seoul (KR); Min Ook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 106 days.

(21) Appl. No.: 18/682,191

(22) PCT Filed: Aug. 8, 2022

(86) PCT No.: PCT/KR2022/011762
§ 371 (c)(1),
(2) Date: Feb. 8, 2024

(87) PCT Pub. No.: WO2023/018140
PCT Pub. Date: Feb. 16, 2023

(65) Prior Publication Data
US 2024/0348925 A1     Oct. 17, 2024

(30) Foreign Application Priority Data
Aug. 9, 2021     (KR) ........................ 10-2021-0104570

(51) Int. Cl.
*H04N 23/68*          (2023.01)
*H04N 23/55*          (2023.01)
(52) U.S. Cl.
CPC ........... *H04N 23/687* (2023.01); *H04N 23/55* (2023.01)

(58) Field of Classification Search
CPC ...... H04N 23/687; H04N 23/55; H04N 23/00; H04N 23/54; G03B 5/04; G03B 17/12;
(Continued)

(56) References Cited

U.S. PATENT DOCUMENTS

| | | | |
|---|---|---|---|
| 2008/0211955 A1* | 9/2008 | Avital | ................... H04N 23/55 348/E5.028 |
| 2010/0045845 A1* | 2/2010 | Yoneyama | ......... G02B 13/0035 348/340 |

(Continued)

FOREIGN PATENT DOCUMENTS

| | | |
|---|---|---|
| JP | 2007-318850 A | 12/2007 |
| KR | 10-1246178 B1 | 3/2013 |

(Continued)

*Primary Examiner* — Padma Haliyur
(74) *Attorney, Agent, or Firm* — Birch, Stewart, Kolasch & Birch, LLP

(57) ABSTRACT

Disclosed in an embodiment of the present invention is a camera actuator comprising: a base; a first lens assembly and a second lens assembly, which are disposed in order in the direction of an optical axis within the base; and a driving unit for moving the first lens assembly and the second lens assembly, wherein the driving unit includes a first lens driving unit for moving the first lens assembly and a second lens driving unit for moving the second lens assembly, the first lens driving unit includes a first piezoelectric unit, the second lens driving unit includes a second piezoelectric unit, and the first piezoelectric unit is disposed to be staggered, in the direction of the optical axis, with respect to the second piezoelectric unit.

14 Claims, 19 Drawing Sheets

(58) Field of Classification Search
CPC .... G03B 2205/0007; H02N 2/00; H02N 2/04;
H02N 2/006
See application file for complete search history.

(56) References Cited

U.S. PATENT DOCUMENTS

| | | | | |
|---|---|---|---|---|
| 2016/0161828 | A1* | 6/2016 | Lee | G02B 7/04 |
| | | | | 359/824 |
| 2017/0131542 | A1* | 5/2017 | Inukai | G02B 27/0006 |
| 2022/0210300 | A1* | 6/2022 | Seo | H04N 23/51 |
| 2022/0357555 | A1* | 11/2022 | Cheng | H04N 23/54 |
| 2023/0179866 | A1* | 6/2023 | Oh | H04N 23/55 |
| | | | | 348/208.11 |
| 2024/0142856 | A1* | 5/2024 | Kim | G03B 3/10 |
| 2024/0275310 | A1* | 8/2024 | Oh | H02N 2/0055 |
| 2024/0422439 | A1* | 12/2024 | Kim | H04N 23/55 |
| 2025/0056108 | A1* | 2/2025 | Ohlgren | H04N 23/69 |

FOREIGN PATENT DOCUMENTS

| | | | | | |
|---|---|---|---|---|---|
| KR | 10-2020-0001627 | A | | 1/2020 | |
| KR | 10-2020-0009868 | A | | 1/2020 | |
| KR | 10-2020-0020147 | A | | 2/2020 | |
| WO | WO-2022250600 | A1 | * | 12/2022 | H04N 23/67 |

* cited by examiner

SECOND-AXIS TILTING

FIRST-AXIS
TILTING

1200

CAMERA USING PIEZOELECTRIC ACTUATOR AND CAMERA DEVICE COMPRISING SAME

CROSS REFERENCE TO RELATED APPLICATIONS

This application is the National Phase of PCT/KR2022/011762 filed on Aug. 8, 2022, which claims priority under 35 U.S.C. § 119(a) to Patent Application No. 10-2021-0104570 filed in the Republic of Korea on Aug. 9, 2021, all of which are hereby expressly incorporated by reference into the present application.

TECHNICAL FIELD

The present invention relates to a camera actuator and a camera device including the same.

BACKGROUND ART

A camera is a device for taking pictures or videos by capturing images of subjects and is mounted on mobile devices, drones, vehicles, or the like. In order to improve the quality of the image, a camera device may have an image stabilizer (IS) function for correcting or preventing an image shake caused by the movement of a user, an auto focusing (AF) function for aligning a focal length of a lens by automatically adjusting an interval between an image sensor and the lens, and a zooming function for capturing an image of a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to the general OIS technique, the motion of the camera may be detected through a gyro sensor or the like, and a lens may tilt or move, or a camera module including a lens and an image sensor may tilt or move based on the detected motion. When the lens or the camera module including the lens and the image sensor tilts or moves for an OIS, it is necessary to additionally secure a space for tilting or moving around the lens or the camera module.

Meanwhile, an actuator for an OIS may be disposed around the lens. In this case, the actuator for an OIS may include actuators, which are in charge of tilting of two axes perpendicular to an optical axis Z, that is, an actuator in charge of X-axis tilting and an actuator in charge of a Y-axis tiling.

However, according to the needs of ultra-slim and ultra-small camera modules, there is a large space constraint for arranging the actuator for an OIS, and it may be difficult to secure a sufficient space for an OIS where the lens or the camera module including the lens and the image sensor itself may tilt or move. In addition, as the camera has a higher pixel density, it is preferable that a size of the lens be increased to increase the amount of received light, and there may be a limit to increasing the size of the lens due to a space occupied by the actuator for an OIS.

In addition, when the zooming function, the AF function, and an OIS function are all included in the camera device, there is a problem that an OIS magnet and an AF or zoom magnet are disposed close to each other to cause magnetic field interference.

In addition, spatial restriction or limitation for moving the lens is present, and a piezoelectric unit has a problem that a driving speed and a length of a rod increase.

DISCLOSURE

Technical Problem

The present invention is directed to providing a camera actuator applicable to ultra-slim, ultra-small, and high-resolution cameras.

In addition, embodiments of the present invention may provide a camera actuator in which piezoelectric units for moving different assemblies are disposed to be misaligned to easily increase driving speeds.

In addition, the embodiments of the present invention may provide a camera actuator which increases driving speeds through a rod with small and different lengths in an optical axis direction, reduces an ineffective area, and resolves spatial restriction with the reduction in length.

The objects of embodiments are not limited thereto and may also include objects or effects that may be identified from the configurations or embodiments to be described below.

Technical Solution

A camera actuator according to an embodiment of the present invention includes a base, a first lens assembly and a second lens assembly disposed sequentially in an optical axis direction in the base, and a driving unit configured to move the first lens assembly and the second lens assembly, wherein the driving unit includes a first lens driving unit configured to move the first lens assembly and a second lens driving unit configured to move the second lens assembly, the first lens driving unit includes a first piezoelectric unit, the second lens driving unit includes a second piezoelectric unit, and the first piezoelectric unit is disposed to be misaligned with the second piezoelectric unit in the optical axis direction.

The first piezoelectric unit may be disposed to be spaced apart from the second piezoelectric unit in the optical axis direction.

The first lens driving unit may further include a first rod connected to the first piezoelectric unit, and the first lens assembly may further include a first elastic unit connected to the first rod.

The second lens driving unit may further include a second rod connected to the second piezoelectric unit, and the second lens assembly may further include a second elastic unit connected to the second rod.

The first elastic unit may include a first sub-elastic unit and a second sub-elastic unit facing each other, and the second elastic unit may include a third sub-elastic unit and a fourth sub-elastic unit facing each other.

The first sub-elastic unit and the second sub-elastic unit may come into contact with the first rod, and the third sub-elastic unit and the fourth sub-elastic unit may come into contact with the second rod.

A length of the first rod in the optical axis direction may be the same as or different from a length of the second rod in the optical axis direction.

The camera actuator may further include a guide unit passing through any one of the first lens assembly and the second lens assembly, wherein the guide unit may include a first guide pin passing through the first lens assembly and a second guide pin passing through the second lens assembly.

Lengths of the first guide pin and the second guide pin in the optical axis direction may be larger than lengths of the first rod and the second rod in the optical axis direction.

The first lens assembly may include a first pin holder surrounding at least a portion of the second guide pin, and the second lens assembly may include a second pin holder surrounding at least a portion of the first guide pin.

The base may include a first side wall and a second side wall corresponding to the first side wall.

The first side wall and the second side wall may have different lengths in the optical axis direction.

At least portions of the first side wall and the second side wall may be disposed to be misaligned in a longitudinal direction.

The first lens assembly and the second lens assembly may be disposed between the first side wall and the second side wall.

The camera actuator may include a first lens group disposed in the first lens assembly, a second lens group disposed in the second lens assembly, a third lens assembly disposed at a front end of the first lens assembly and accommodating a third lens group, and a fourth lens group disposed in the base at a rear end the second lens group, wherein the first lens group and the fourth lens group may be fixed relative to the second lens group and the third lens group.

Advantageous Effects

According to the embodiments of the present invention, it is possible to provide a camera actuator applicable to ultra-slim, ultra-small, and high-resolution cameras. In particular, it is possible to effectively arrange an actuator for an optical image stabilizer (OIS) even without increasing the overall size of a camera device.

According to the embodiments of the present invention, it is possible to implement a precise OIS function by implementing X-axis tilting and Y-axis tilting with a stable structure without causing magnetic field interference between the X-axis tilting and the Y-axis tilting and not causing magnetic field interference with an AF actuator or a zooming actuator.

According to the embodiments of the present invention, it is possible to sufficiently secure the amount of light by resolving a size limit of a lens and implement an OIS with low power consumption.

The present invention is directed to providing a camera actuator applicable to ultra-slim, ultra-small, and high-resolution cameras.

In addition, the embodiments of the present invention can implement a camera actuator in which piezoelectric units for moving different assemblies are disposed to be misaligned to easily increase driving speeds.

In addition, the embodiments of the present invention can implement a camera actuator which increases driving speeds through a rod with small and different lengths in an optical axis direction, reduces an ineffective area, and resolves spatial restriction with the reduction in length.

Various and beneficial advantages and effects of the present invention are not limited to the above-described contents and will be more readily understood in a process of describing specific embodiments of the present invention.

MODES OF THE INVENTION

Figure 1:
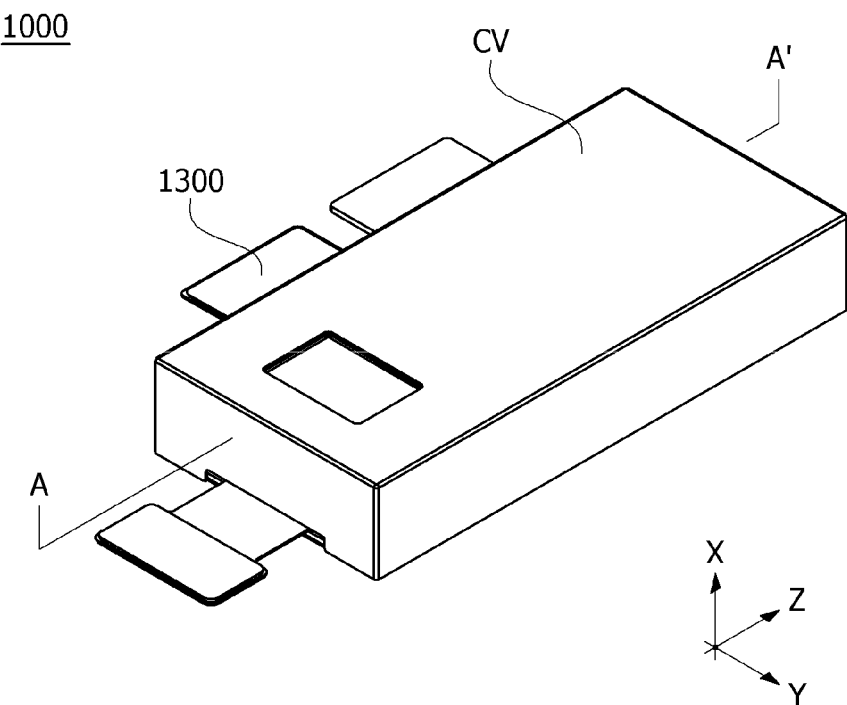
FIG. 1 is a perspective view illustrating a camera module according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
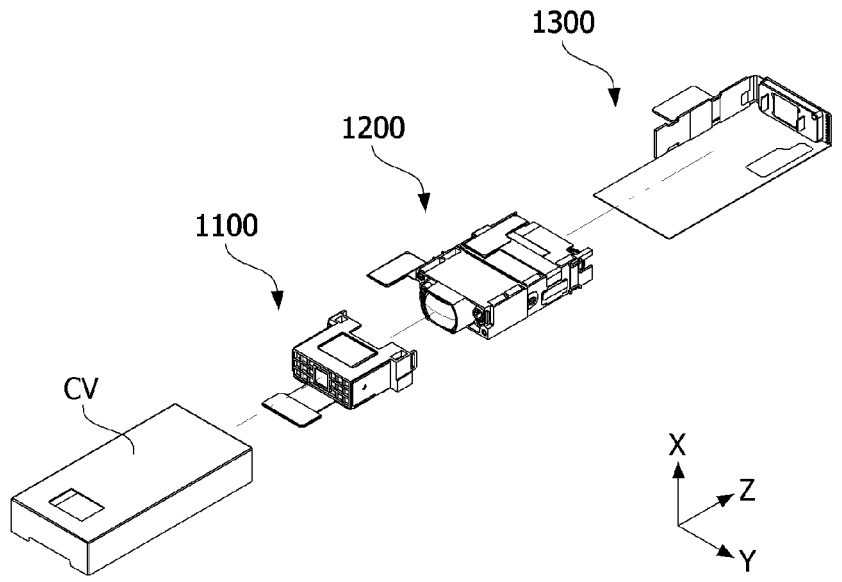
FIG. 2 is an exploded perspective view illustrating the camera module according to the embodiment.
Figure 3:
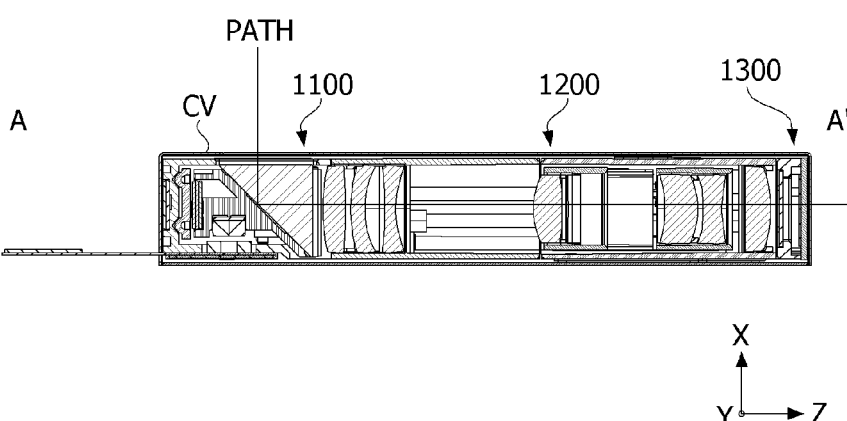
FIG. 3 is a cross-sectional view along line A-A' in FIG. 1.

FIG. 1 is a perspective view illustrating a camera module according to an embodiment, FIG. 2 is an exploded perspective view illustrating the camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

The first camera actuator 1100 may include a fixed focal length lens disposed in a predetermined barrel (not illustrated). The fixed focal length lens may be referred to as "single focal length lens" or "single lens."

The first camera actuator 1100 may change an optical path. In an embodiment, the first camera actuator 1100 may vertically change the optical path through an internal optical member (e.g., a mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not illustrated) disposed in a predetermined housing (not illustrated) and capable of driving a lens unit. Although the actuator may be a voice coil motor, a micro actuator, a silicone actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera module formed of the plurality of camera modules may be mounted in various electronic devices such as a mobile terminal. Furthermore, the first camera module and the second camera module may be an integrated or separated structure.

Referring to FIG. 3, the camera module according to the embodiment may include the first camera actuator 1100 for performing the OIS function and the second camera actuator 1200 for performing the zooming function and the AF function.

Light may enter the camera module through an opening region positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in a first direction. In addition, the first direction is the X-axis direction in the drawings and may be used interchangeably with a second axis direction or the like. For example, the first direction may be parallel to a direction in which light is incident in the first camera actuator, and a third direction may be parallel to the optical axis direction. A second direction is a Y-axis direction in the drawings and may be used interchangeably with a first axis direction or the like. The second direction is a direction perpendicular to the first direction. In addition, the third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. Detailed description thereof will be made below.

In addition, hereinafter, the optical axis direction is the third direction (Z-axis direction) in the description of the second camera actuator 1200 will be described below based on this.

In addition, with this configuration, the camera module according to the embodiment may resolve the spatial limits of the first camera actuator and the second camera actuator by changing the optical path. In other words, the camera module according to the embodiment may extend the optical path in response to the change in the optical path while minimizing the thickness of the camera module. Furthermore, it should be understood that the second camera actuator may provide a high range of magnification by controlling a focus or the like in the extended optical path.

In addition, the camera module according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, the second camera actuator 1200 may include at least one of a first lens assembly, a second lens assembly, a third lens assembly, a fourth lens assembly, and a guide pin. In addition, the second camera actuator 1200 may include a coil and a magnet to perform a high-magnification zooming function.

For example, although the first lens assembly and the second lens assembly may be moving lenses that move through a driving element and a guide pin and the third lens assembly and the fourth lens assembly may be fixed lenses, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by the driving element (e.g., a piezo, a voice coil motor (VCM), or a motor). The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
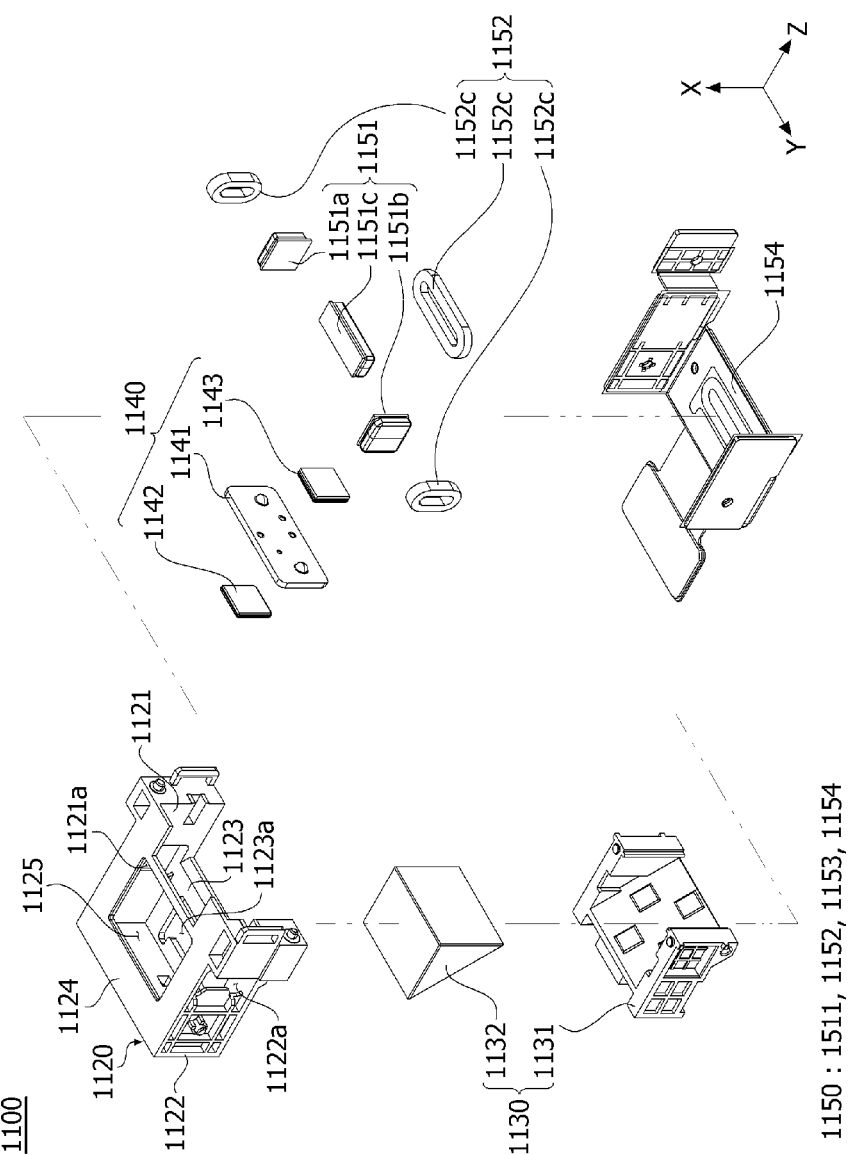
FIG. 4 is an exploded perspective view of a first camera actuator according to the embodiment.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnet 1142 having a coupling strength with the rotating plate 1141, and a second magnet 1143 positioned in the rotating plate 1141. In addition, the first driving unit 1150 includes a driving magnet 1151, a driving coil 1152, a Hall sensor unit 1153, and a first board unit 1154.

The first shield can (not illustrated) may be positioned at an outermost side of the first camera actuator 1100 to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside a first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may include a lower surface as a lower side portion of the first housing 1120

In addition, the first housing side portion 1121 may include a first housing hole 111210a. The first coil 1152a to be described below may be positioned in the first housing hole 111210a.

In addition, the second housing side portion 1122 may include a second housing hole 1122a. In addition, the second coil 1152b to be described below may be positioned in the second housing hole 1122a.

The first coil 1152a and the second coil 1152b may be coupled to the first board unit 1154. In the embodiment, the first coil 1152a and the second coil 1152b may be electrically connected to the first board unit 1154 so that a current may flow therebetween. The current is an element of an electromagnetic force capable of tilting the second camera actuator with respect to an X-axis.

In addition, the third housing side portion 1123 may include a third housing hole 1123a. A third coil 1152c to be described below may be positioned in the third housing hole 1123a. The third coil 1152c may be coupled to the first board unit 1154. In addition, the third coil 1152c may be electrically connected to the first board unit 1154 so that a current may flow therebetween. The current is an element of an electromagnetic force capable of tilting the second camera actuator with respect to a Y-axis.

The fourth housing side portion 1124 may include a first housing groove 1124a. The first magnet 1142 to be described below may be disposed in an area facing the first housing groove 1124a. Therefore, the first housing 1120 may be coupled to the rotating plate 1141 by a magnetic force or the like.

In addition, the first housing groove 1124a according to the embodiment may be positioned on an inner surface or an outer surface of the fourth housing side portion 1124. Therefore, the first magnet 1142 may also be disposed to correspond to a position of the first housing groove 1124a.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in an accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnet 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present application is not limited thereto. In addition, the optical member 1132 may reflect light reflected from the outside (e.g., an object) into the camera module. In other words, the optical member 1132 can resolve spatial limits of the first camera actuator and the second camera actuator by changing the path of the reflected light. Therefore, it should be understood that the camera module may provide a high range of magnification by extending the optical path while minimizing a thickness thereof.

The rotating unit 1140 includes the rotating plate 1141, the first magnet 1142 having the coupling strength with the rotating plate 1141, and the second magnet 1143 positioned in the rotating plate 1141.

The rotating plate 1141 may be coupled to the mover 1130 and the first housing 1120. The rotating plate 1141 may include an additional magnet (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below.

In addition, the first magnet 1142 includes a plurality of yokes, and the plurality of yokes may be positioned to face each other based on the rotating plate 1141. In the embodiment, the first magnet 1142 may include a plurality of facing yokes. In addition, the rotating plate 1141 may be positioned between the plurality of yokes.

As described above, the first magnet 1142 may be positioned in the first housing 1120. In addition, as described above, the first magnet 1142 may be seated on an inner surface or outer surface of the fourth housing side portion 1124. For example, the first magnet 1142 may be seated in a groove formed in the outer surface of the fourth housing side portion 1124. Alternatively, the first magnet 1142 may be seated in the first housing groove 1124a.

In addition, the second magnet 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnet 1143 and the first magnet 1142 disposed therein. In the present invention, the positions of the first magnet 1142 and the second magnet 1143 may be interchangeable.

The first driving unit 1150 includes the driving magnet 1151, the driving coil 1152, the Hall sensor unit 1153, and the first board unit 1154.

The driving magnet 1151 may include a plurality of magnets. In the embodiment, the driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. Detailed description thereof will be made below.

The driving coil 1152 may include a plurality of coils. In the embodiment, the driving coil 1152 may include the first coil 1152a, the second coil 1152b, and the third coil 1152c.

The first coil 1152a may be positioned to face the first magnet 1151a. Therefore, as described above, the first coil 1152a may be positioned in the first housing hole 111210a of the first housing side portion 1121.

In addition, the second coil 1152b may be positioned to face the second magnet 1151b. Therefore, as described above, the second coil 1152b may be positioned in the second housing hole 1122a of the second housing side portion 1122.

The first coil 1152a may be positioned to face the second coil 1152b. In other words, the first coil 1152a may be symmetrically disposed with the second coil 1152b with respect to the first direction (X-axis direction). This may also be applied to the first magnet 1151a and the second magnet 1151b in the same manner. In other words, the first magnet 1151a and the second magnet 1151b may be symmetrically disposed with respect to the first direction (X-axis direction). In addition, at least portions of the first coil 1152a, the second coil 1152b, the first magnet 1151a, and the second magnet 1151b may be disposed to overlap in the second direction (Y-axis direction). With this configuration, the X-axis tilting may be accurately performed without being biased to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, as described above, the third coil 1152c may be positioned in the third housing hole 1123a of the third housing side portion 1123. The third coil 1152c may generate an electromagnetic force with the third magnet 1151c so that the mover 1130 and the rotating unit 1140 may perform Y-axis tilting based on the first housing 1120.

Here, X-axis tilting is tilting with respect to the X-axis, and Y-axis tilting is tilting with respect to the Y-axis.

The Hall sensor unit 1153 may include a plurality of Hall sensors. The Hall sensor corresponds to and is used interchangeably with "sensor unit" to be described below. In the embodiment, the Hall sensor unit 1153 may include a first Hall sensor 1153a, a second Hall sensor 1153b, and a third Hall sensor 1153c.

The first Hall sensor 1153a may be positioned inside the first coil 1152a. In addition, the second Hall sensor 1153b may be disposed symmetrically with the first Hall sensor 1153a in the first direction (X-axis direction) and the third direction (Z-axis direction). In addition, the second Hall sensor 1153b may be positioned inside the second coil 1152b.

The first Hall sensor 1153a may detect a change in magnetic flux inside the first coil 1152a. In addition, the second Hall sensor 1153b may detect a change in magnetic flux in the second coil 1152b. Therefore, it is possible to perform position sensing between the first and second magnets 1151a and 1151b and the first and second Hall sensors 1153a and 1153b. For example, since the first and second Hall sensors 1153a and 1153b may detect the changes in magnet fluxes, the second camera actuator according to the embodiment may control the X-axis tilting.

In addition, the third Hall sensor 1153c may be positioned inside the third coil 1152c. The third Hall sensor 1153c may detect a change in magnetic flux inside the third coil 1152c.

Therefore, it is possible to perform position sensing between the third magnet 1151c and the third Hall sensor 1153bc. Therefore, the second camera actuator according to the embodiment may control the Y-axis tilting.

The first board unit 1154 may be positioned under the first driving unit 1150. The first board unit 1154 may be electrically connected to the driving coil 1152 and the Hall sensor unit 1153. For example, the first board unit 1154 may be coupled to the driving coil 1152 and the Hall sensor unit 1153 by a surface mount technology (SMT). However, the present invention is not limited to this method.

The first board unit 1154 may be positioned between the first shield can (not illustrated) and the first housing 1120 and coupled to the shield can 1101 and the first housing 1120. The coupling method may be variously performed as described above. In addition, through the coupling, the driving coil 1152 and the Hall sensor unit 1153 may be positioned within an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Detailed descriptions of the Hall sensor unit 1153 and the first board unit 1154 to be described below will be made below.

Figure 5:
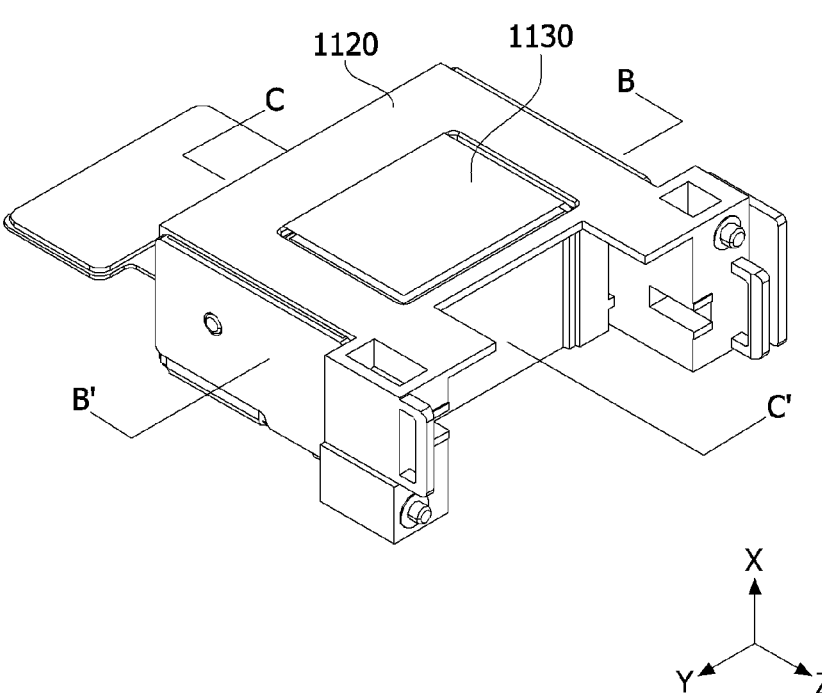
FIG. 5 is a perspective view of the first camera actuator according to the embodiment from which a shield can and a board are removed.
Figure 6:
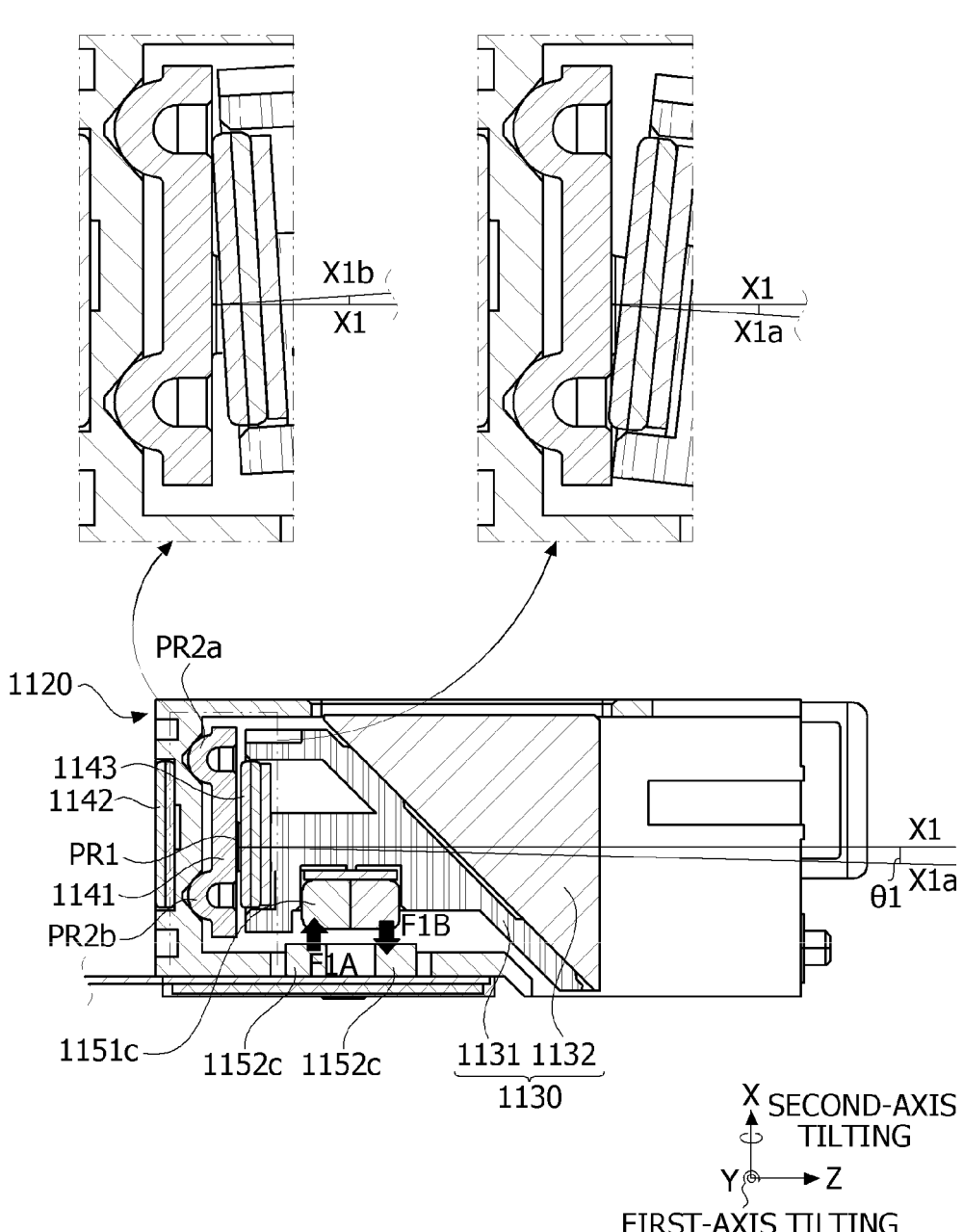
FIG. 6 is a cross-sectional view along line B-B' in FIG. 5.
Figure 7:
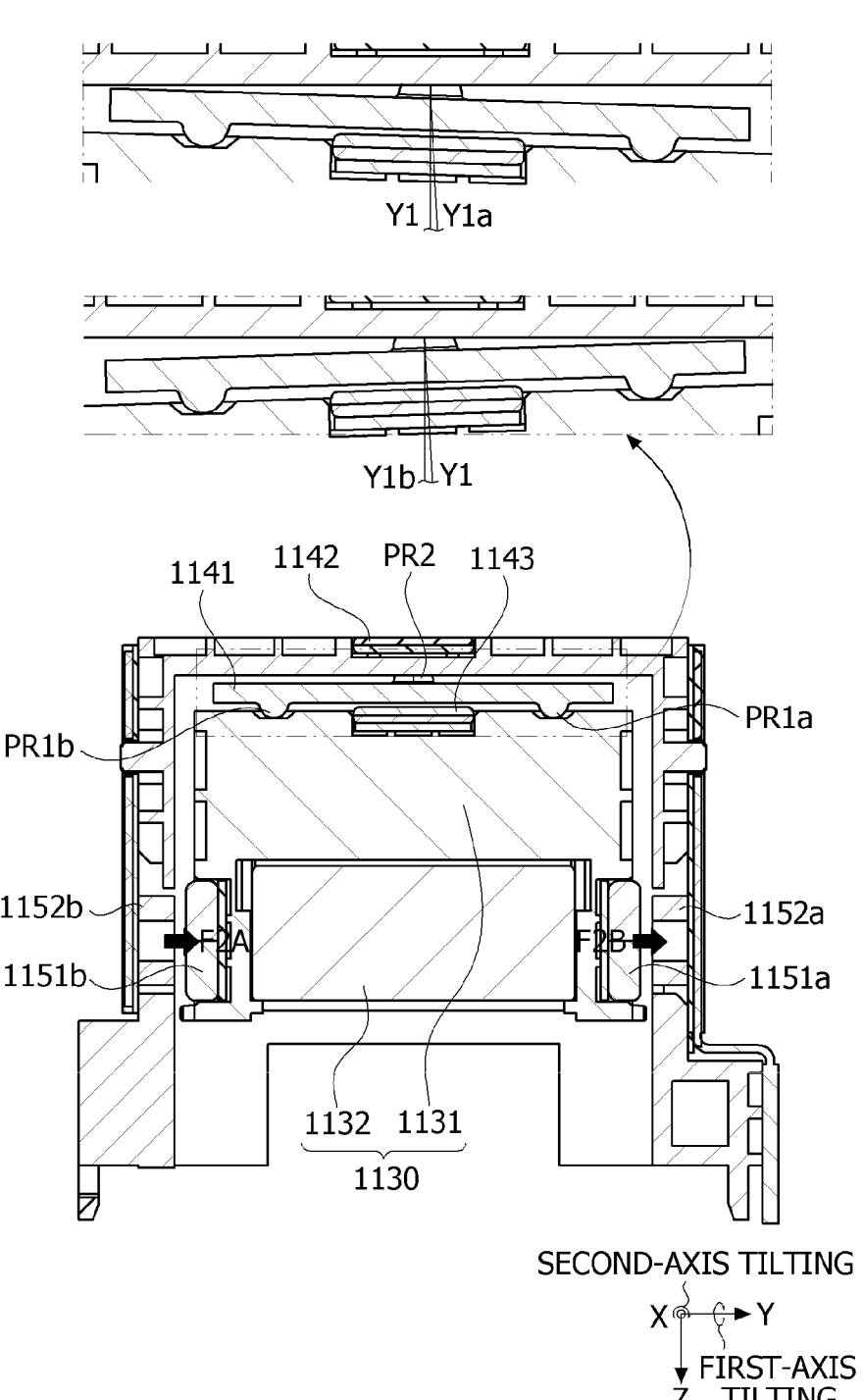
FIG. 7 is a cross-sectional view along line C-C' in FIG. 5.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, the first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap each other in the second direction (Y-axis direction), and the first magnet 1151a and the second magnet 1151b may overlap each other in the second direction (Y-axis direction). With this configuration, the electromagnetic force applied to the outer surfaces of the holder (the first holder outer surface and the second holder outer surface) may be positioned on parallel axes in the second direction (Y-axis direction) so that the X-axis tilting may be performed accurately and precisely.

In addition, a first accommodating groove (not illustrated) may be positioned at the fourth holder outer surface. In addition, first protrusions PR1a and PR1b may be disposed in the first accommodating groove. Therefore, when the X-axis tilting is performed, the first protrusions PR1a and PR1b may serve as reference axes (or rotation axes) of the tilting. Therefore, the rotating plate 1141 and the mover 1130 may move to a left or right side.

As described above, the second protruding portion PR2 may be seated in a groove of an inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS can be performed by the first protruding portion and the second protruding portion.

Referring to FIG. 6, the Y-axis tilting may be performed. In other words, an OIS can be implemented by rotating the first camera actuator in the first direction (X-axis direction).

In the embodiment, the third magnet 1151c disposed under the holder 1131 may generate the electromagnetic force with the third coil 1152c to tilt or rotate the mover 1130 in the first direction (X-axis direction).

Specifically, the rotating plate 1141 may be coupled to the first housing 1120 and the mover 1130 by the first magnet 1142 in the first housing 1120 and the second magnet 1143 in the mover 1130. In addition, the first protruding portions PR1 may be spaced apart from each other in the first direction (X-axis direction) and supported by the first housing 1120.

In addition, the rotating plate 1141 may rotate or tilt using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS can be implemented by rotating (X1→X1b or X1a) the mover 1130 at a first angle θ1 in the X-axis direction by first electromagnetic forces F1A and F1B between the third magnet 1151c disposed in the third seating groove and the third coil 1152c disposed on the third board side portion. The first angle θ1 may be in a range of ±1° to ±3°. However, the present application is not limited thereto. Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151a and the second magnet 1151b disposed in the holder 1131 may tilt or rotate the rotating plate 1141 and the mover 1130 in the second direction (Y-axis direction) by generating the electromagnetic force with the first coil 1152a and the second coil 1152b, respectively.

The rotating plate 1141 may be rotated or tilted (X-axis tilting) in the second direction using the first protruding portion PR1 as a reference axis (or a rotation axis).

For example, an OIS can be implemented by rotating (Y1→Y1a or Y1b) the mover 130 at a second angle θ2 in the Y-axis direction by second electromagnetic forces F2A and F2B between the first and second magnets 1151a and 1151b disposed in the first seating groove and the first and second coils 1152a and 1252b disposed on the first and second board side portions. The second angle θ2 may be in a range of ±1° to ±3°. However, the present application is not limited thereto.

In addition, as described above, the electromagnetic forces generated by the first and second magnets 1151a and 1151b and the first and second coils 1152a and 1152b may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may rotate with respect to the first direction. Alternatively, the mover 130 may move in the second direction.

As described above, the first camera actuator according to the embodiment may control the rotating plate 1141 and the mover 1130 to rotate in the first direction (X-axis direction) or second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" corresponds to rotation or tilting in the first direction (X-axis direction), and "X-axis tilting" corresponds to rotation or tilting in the second direction (Y-axis direction)

Figure 8:
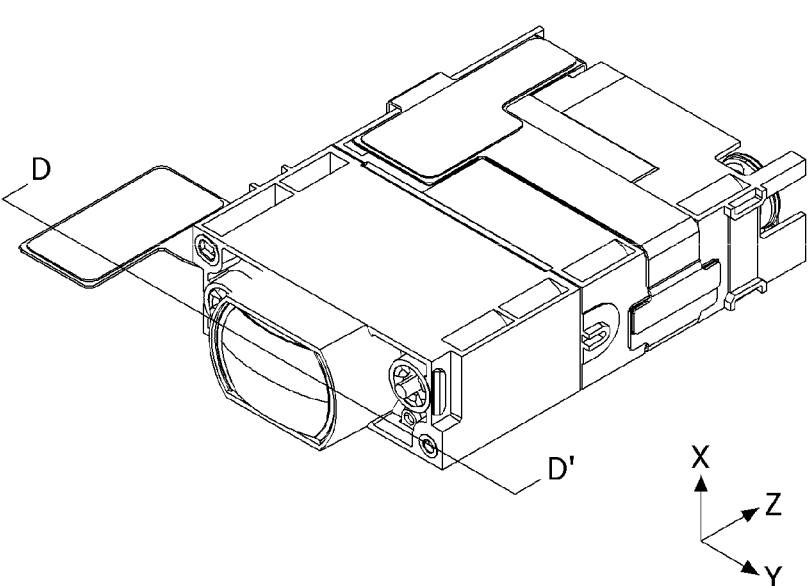
FIG. 8 is a perspective view of a second camera actuator according to the embodiment.
Figure 9:
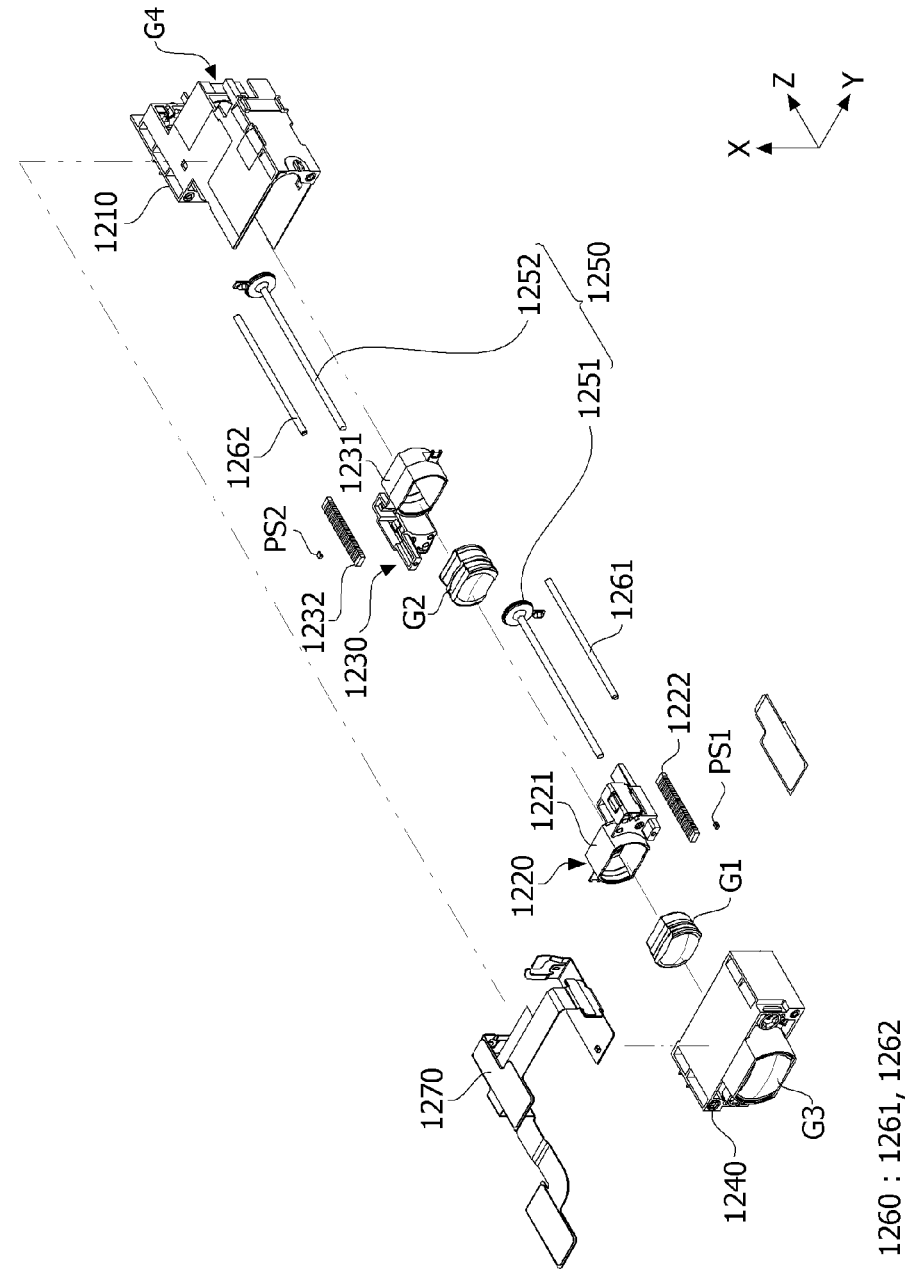
FIG. 9 is an exploded perspective view of the second camera actuator according to the embodiment.

FIG. 8 is a perspective view of a second camera actuator according to the embodiment, and FIG. 9 is an exploded perspective view of the second camera actuator according to the embodiment.

Figure 10:
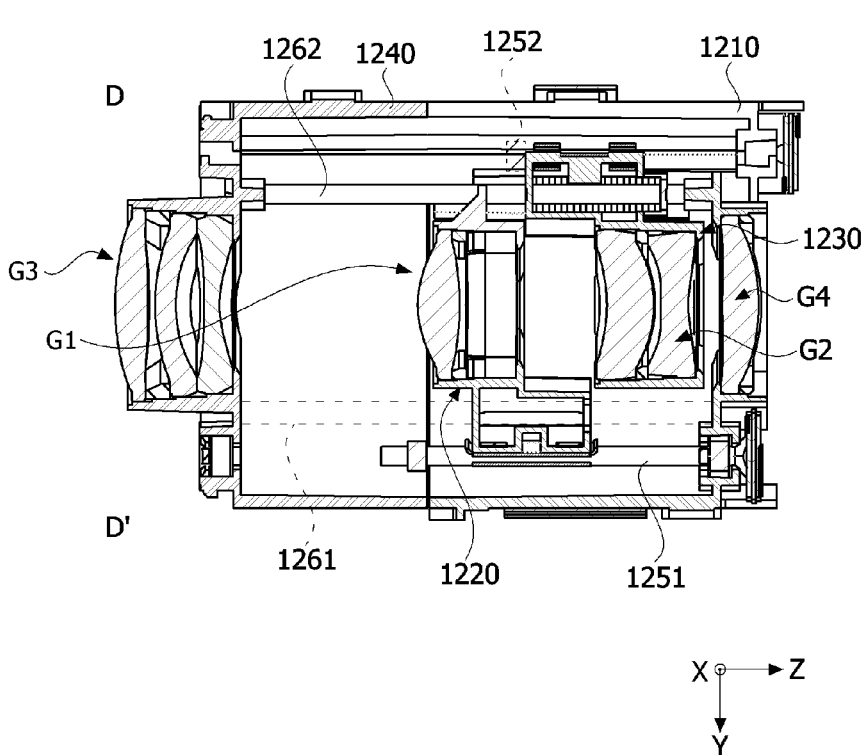
FIG. 10 is a view along line D-D' in FIG. 8.

Referring to FIGS. 8 to 10, the second camera actuator 1200 according to the embodiment may include a base 1210, a first lens assembly 1220, a second lens assembly 1230, a third lens assembly 1240, a second driving unit 1250, a guide unit 1260, and a second board unit 1270.

In addition, as described above, the third direction (Z-axis direction) corresponds to the optical axis direction, and the second direction (Y-axis direction) corresponds to a direction from a second side wall to a first side wall and is perpendicular to the third direction (Z-axis direction). In addition, the first direction (X-axis direction) may be a direction perpendicular to the second direction (Y-axis direction) and the third direction (Z-axis direction). In addition, the first direction (X-axis direction) is used interchangeably with "height direction," and the second direction (Y-axis direction) is used interchangeably with "longitudinal direction."

In addition, the second camera actuator 1200 may include the base 1210 disposed at one side thereof, the first lens assembly 1220 disposed in the base 1210, the second lens assembly 1230, the third lens assembly 1240 disposed at a front end or in front of the base 1210 (or the first lens assembly 1220), the second driving unit 1250 for moving the first lens assembly 1220 and the second lens assembly 1230, the guide unit 1260 disposed in the base 1210, and the second board unit 1270 of which at least a portion is disposed outside the base 1210 and which is electrically connected to the second driving unit 1250.

In addition, the second camera actuator 1200 may include a first lens group G1, a second lens group G2, and a third lens group G3 seated on each lens assembly. For example, the first lens group G1 may be positioned in the first lens assembly 1220. The first lens assembly 1220 may include an accommodating hole accommodating the first lens group G1. In addition, the second lens group G2 may be positioned in the second lens assembly 1230. The second lens assembly 1230 may include an accommodating hole accommodating the second lens group G2. In addition, the third lens group G3 may be positioned in the third lens assembly 1240. The third lens assembly 1240 may include an accommodating hole accommodating the third lens group G3. Furthermore, the second camera actuator may further include a fourth lens group G4 disposed in the base 1210.

The first lens group G1, the second lens group G2, the third lens group G3, and the fourth lens group G4 may be composed of a single lens or a plurality of lenses. Furthermore, the second camera actuator 1200 may further include an additional lens group (e.g., a fifth lens group) including a plurality of lenses or a single lens.

In addition, the third lens assembly 1240, the first lens assembly 1220, and the second lens assembly 1230 may be disposed sequentially in the optical axis direction (Z-axis direction). In addition, the third lens group G3, the first lens group G1, the second lens group G2, and the fourth lens group G4 may be disposed sequentially in the optical axis direction (Z-axis direction). The fourth lens group G4 may be positioned in the base 1210 and coupled to the base 1210. Therefore, the fourth lens group G4 may be positioned in the base 1210 at a rear end of the second lens group G2.

In an embodiment, the first lens group G1 and the fourth lens group G4 may be fixed relative to the second lens group G2 and the third lens group G3. At least one of the first lens group G1 to the fourth lens group G4 may have a D-cut shape, thereby providing improved optical characteristics as compared to a diameter. For example, at least one of the lenses in the first lens group G1 to the fourth lens group G4 may have a non-circular shape.

In addition, the first lens assembly 1220 and the second lens assembly 1230 may move along the optical axis by the second driving unit 1250. In an embodiment, the first lens assembly 1220 and the second lens assembly 1230 may move relatively.

The second driving unit 1250 may include a first lens driving unit 1251 for moving the first lens assembly 1220 in the optical axis direction (Z-axis direction) and a second lens driving unit 1252 for moving the second lens assembly 1230 in the optical axis direction (Z-axis direction).

In addition, the guide unit 1260 may pass through any one of the first lens assembly 1220 and the second lens assembly 1230. In an embodiment, the first guide unit 1260 may include a first guide pin 1261 passing through the first lens assembly 1220 and a second guide pin 1262 passing through the second lens assembly 1230.

Hereinafter, detailed description of the second camera actuator 1200 of the camera module according to the embodiment will be made with reference to the accompanying drawings.

Figure 11:
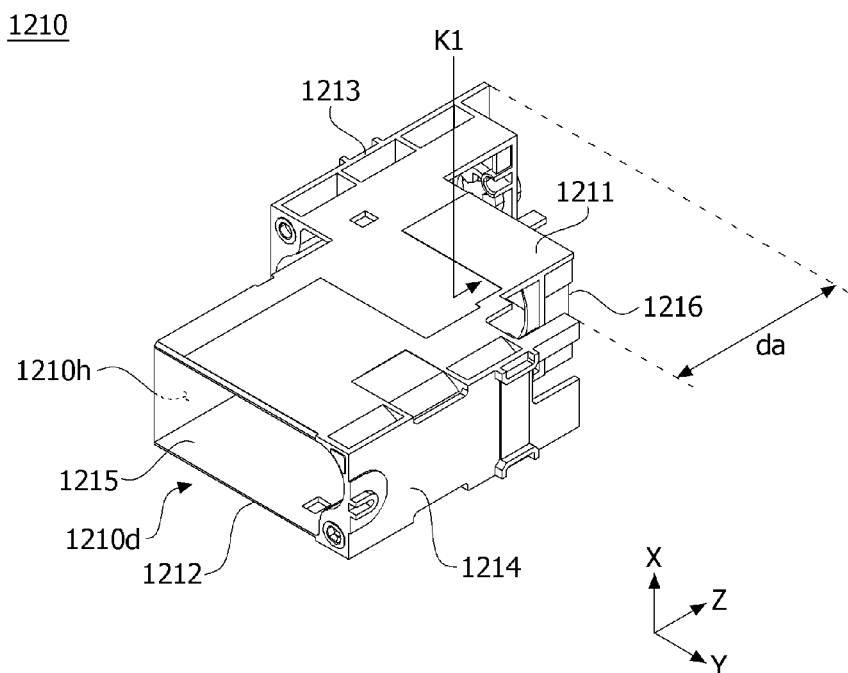
FIG. 11 is a perspective view of a base according to the embodiment.
Figure 12:
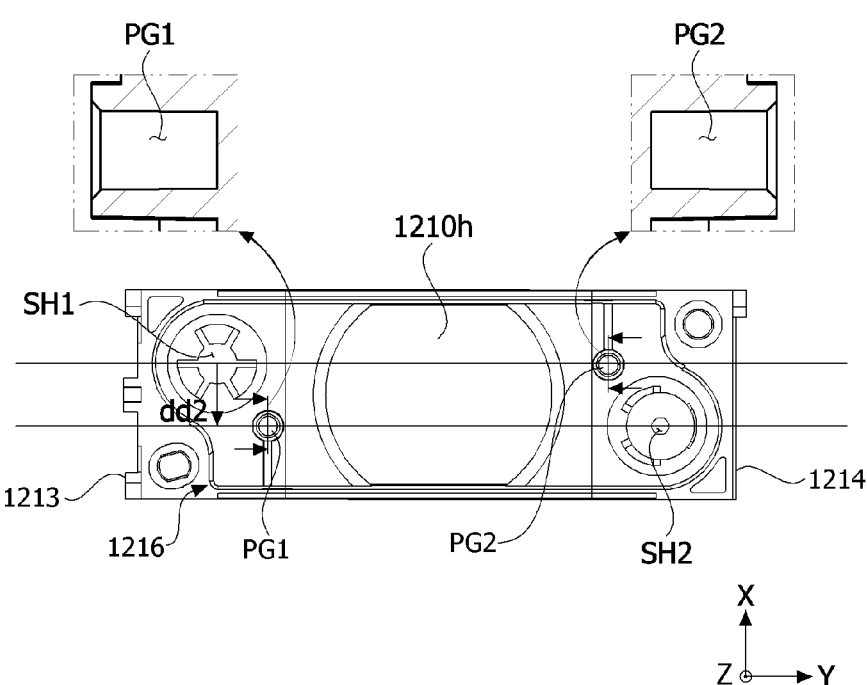
FIG. 12 is a view in a K1 direction in FIG. 11.
Figure 13:
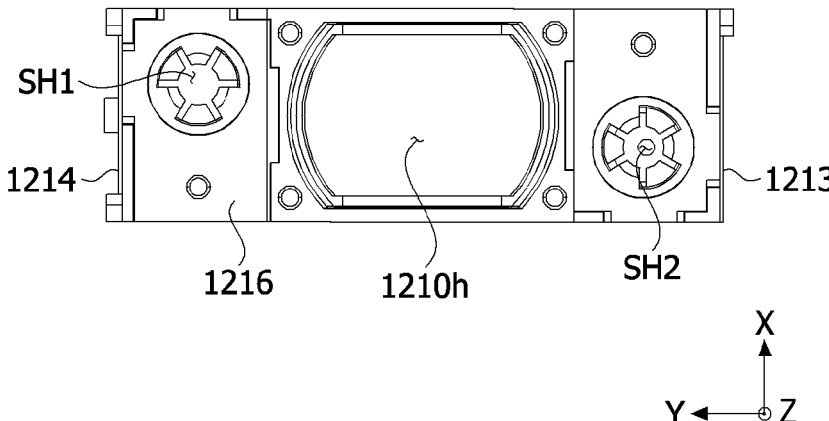
FIG. 13 is a rear view of the base according to the embodiment.

FIG. 11 is a perspective view of a base according to the embodiment, FIG. 12 is a view in a K1 direction in FIG. 11, and FIG. 13 is a rear view of the base according to the embodiment.

Referring to FIGS. 11 to 13, the base 1210 according to the embodiment may include an accommodating hole 1210*h* accommodating the first lens assembly, the second lens assembly, and the fourth lens group. For example, the base 1210 may have a rectangular parallelepiped shape with a space therein. In addition, the first lens assembly, the second lens assembly, and the fourth lens group may be disposed sequentially in the optical axis direction (Z-axis direction) in the base 1210.

The base 1210 according to the embodiment may include a base upper surface 1211, a base lower surface 1212, a first side wall 1213, a second side wall 1214, a third side wall 1215, and a fourth side wall 1216.

First, the base 1210 may include a base upper surface 1211 and a base lower surface 1212 corresponding to the base upper surface 1211. Any one of the base upper surface 1211 and the base lower surface 1212 may be coupled to the second board unit.

Furthermore, the base upper surface 1211 and the base lower surface 1212 of the base 1210 may include a connecting hole and may be electrically connected to an internal position sensor (e.g., a Hall sensor) through the connecting hole. Alternatively, the position sensor may be accommodated in the connecting hole.

In addition, the base 1210 may include the first side wall 1213 and the second side wall 1214 corresponding to the first side wall 1213. The second side wall 1214 may be positioned to face the first side wall 1213. In an embodiment, the first side wall 1213 may be symmetrically disposed with the second side wall 1214 with respect to the third direction (Z-axis direction). The first side wall 1213 and the second side wall 1214 may be disposed to be spaced apart from each other in the second direction (Y-axis direction). In addition, at least portions of the first side wall 1213 and the second side wall 1214 may overlap each other in the second direction (Y-axis direction).

In addition, the base 1210 may further include the third side wall 1215 and the fourth side wall 1216 which are disposed between the first side wall 1213 and the second side wall 1214 and correspond to each other.

The third side wall 1215 and the fourth side wall 1216 may be disposed perpendicular to the first side wall 1213 and the second side wall 1214.

In addition, the third side wall 1215 may be positioned to correspond to the fourth side wall 1216. The third side wall 1215 may be positioned to face the fourth side wall 1216. In an embodiment, the third side wall 1215 may be symmetrically disposed with the fourth side wall 1216 with respect to the second direction (Y-axis direction).

The third side wall 1215 and the fourth side wall 1216 may be disposed to be spaced apart from each other in the second direction (Y-axis direction). In addition, at least portions of the third side wall 1215 and the fourth side wall 1216 may overlap each other in the second direction (Y-axis direction).

The first side wall 12101*a*, the second side wall 1214, the third side wall 1215, and the fourth side wall 1216 may be formed in an integrally injection-molded shape or coupled as separate components.

The third side wall 1215 and the fourth side wall 1216 may include a groove that at least one of a first rod, a second rod, a first guide pin, and a second guide pin, which will be described below, passes or is seated.

In an embodiment, the third side wall 1215 and the fourth side wall 1216 may include a hole through which the first rod, the second rod, the first guide pin, and the second guide pin pass or a groove in which the first rod, the second rod, the first guide pin, and the second guide pin are seated.

For example, the fourth side wall 1216 may include a first rod hole SH1 through which the first rod passes, a second rod hole SH2 through which the second rod passes, a first guide groove PG1 in which the first guide pin is seated, and a second guide groove PG2 in which the second guide pin is seated.

The first rod hole SH1 and the second rod hole SH2 may be positioned on the fourth side wall 1216.

In addition, the first guide groove PG1 and the second guide groove PG2 may be positioned on an inner surface of the fourth side wall 1216. The first guide groove PG1 and the second guide groove PG2 may be misaligned in the height direction or first direction (X-axis direction). For example, the first guide groove PG1 and the second guide groove PG2 may be spaced a predetermined distance dd1 from each other in the first direction (X-axis direction). Alternatively, the first guide groove PG1 and the second guide groove PG2 may have different separation distances from the base lower surface 1212 or the base upper surface 1211 in the first direction or height direction.

The first rod hole SH1 and the second rod hole SH2 may be misaligned in the height direction or first direction (X-axis direction) on the fourth side wall 1216. In addition, at least portions of the first rod hole SH1 and the second rod hole SH2 may overlap in the second direction or longitudinal direction.

For example, the first rod hole SH1 and the second rod hole SH2 may be spaced the predetermined distance dd1 from each other in the first direction (X-axis direction) and the second direction (Y-axis direction). Alternatively, the first rod hole SH1 and the second rod hole SH2 may have different separation distances from the base lower surface 1212 or the base upper surface 1211 in the first direction or height direction.

With this configuration, a length of the base 1210 in the height direction can be reduced. Therefore, it is possible to reduce lengths of the second camera actuator including the base 1210, the camera module including the second camera actuator, and an electronic device including the camera module in the height direction. Therefore, it is possible to miniaturize the electronic device and the camera module and at the same time, provide desired optical characteristics.

In addition, a center of the first rod hole SH1 and a center of the second guide groove PG2 may overlap each other or be misaligned in the second direction (Y-axis direction). For example, since the center of the first rod hole SH1 and the center of the second guide groove PG2 overlap each other in the second direction (Y-axis direction), it is possible to minimize optical axis distortion between the first lens group in the first lens assembly and the second lens group in the second lens assembly even when the first lens assembly is moved by the first rod.

In addition, a center of the second rod hole SH2 and a center of the first guide groove PG1 may overlap each other or be misaligned in the second direction (Y-axis direction). For example, since the center of the second rod hole SH2 and the center of the first guide groove PG1 overlap each other in the second direction (Y-axis direction), it is possible to minimize optical axis distortion between the first lens group in the first lens assembly and the second lens group in the second lens assembly even when the second lens assembly is moved by the second rod.

Furthermore, the first side wall 1213 and the second side wall 1214 of the base 1210 according to the embodiment may have different lengths in the optical axis direction (Z-axis direction). For example, at least portions of the first side wall 1213 and the second side wall 1214 may be disposed to be misaligned in the longitudinal direction (Y-axis direction). Therefore, as will be described below, a first piezoelectric unit may be disposed to be misaligned with a second piezoelectric unit in the optical axis direction. Therefore, it is possible to easily reduce lengths of the first rod and the second rod in the optical axis direction. Therefore, it is possible to easily reduce driving frequencies of the first and second piezoelectric units of the second driving unit, thereby increasing moving speeds of the first lens assembly and the second lens assembly. Furthermore, it is possible to minimize an area (corresponding to an ineffective area to be described below) in which the lens assembly does is not moved by the first and second piezoelectric units of the first and second rods.

Furthermore, the first side wall 1213 and the second side wall 1214 may have different lengths in the optical axis direction (Z-axis direction). For example, since the second lens assembly is disposed behind the first lens assembly and the second guide pin is closer to the second side wall 1214 than to the first side wall 1213, the second side wall 1214 may have a larger length than the first side wall 1213 in the optical axis direction.

Furthermore, the first lens assembly and the second lens assembly may be disposed between the first side wall 1213 and the second side wall 1214. Therefore, the first side wall 1213 and the second side wall 1214 may overlap at least portions of the first lens assembly and the second lens assembly in the second direction or longitudinal direction or surround portions of the first lens assembly and the second lens assembly.

Figure 14:
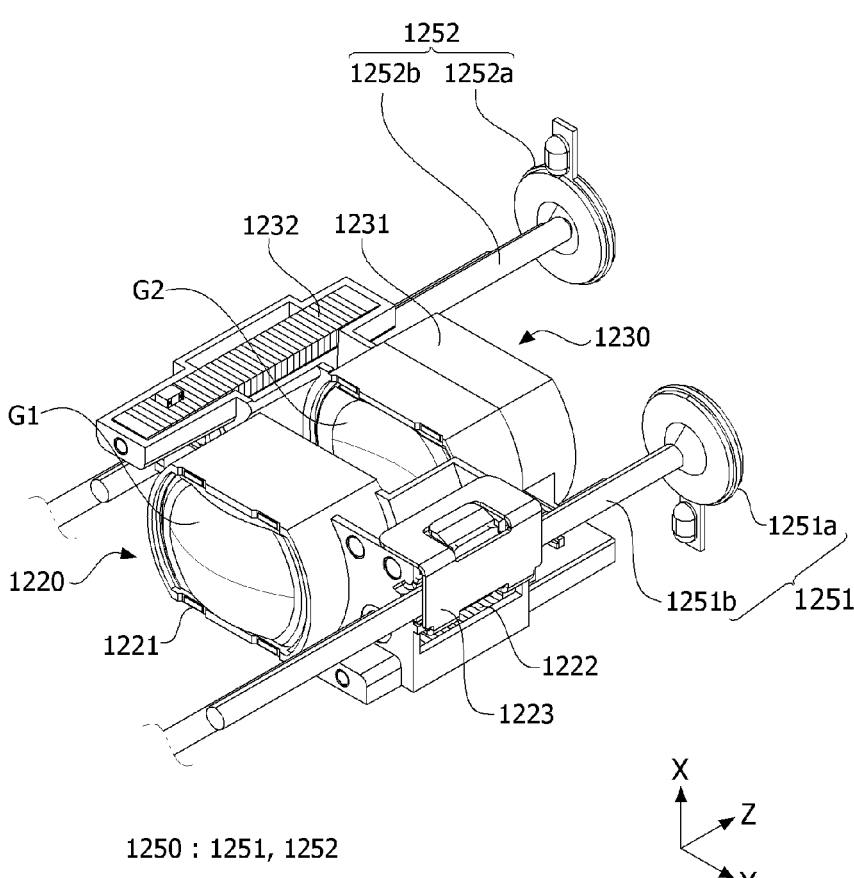
FIG. 14 is a perspective view of a first lens assembly, a second lens assembly, a guide pin, and a second driving unit according to the embodiment.
Figure 15:
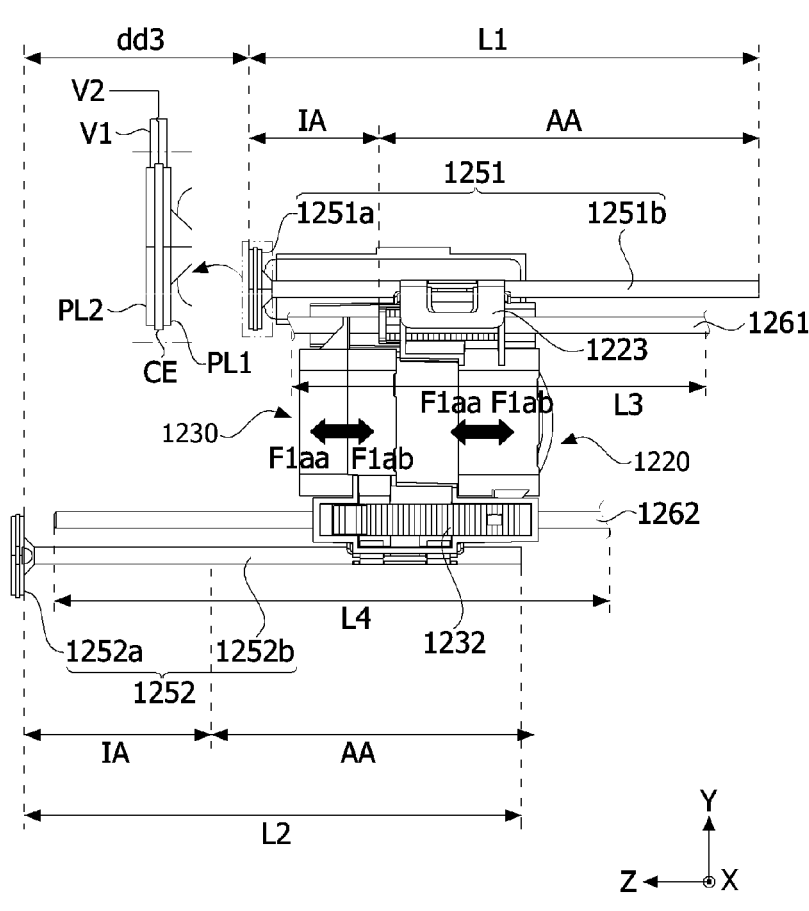
FIG. 15 is a top view of the first lens assembly, the second lens assembly, the guide pin, and the second driving unit according to the embodiment.
Figure 16:
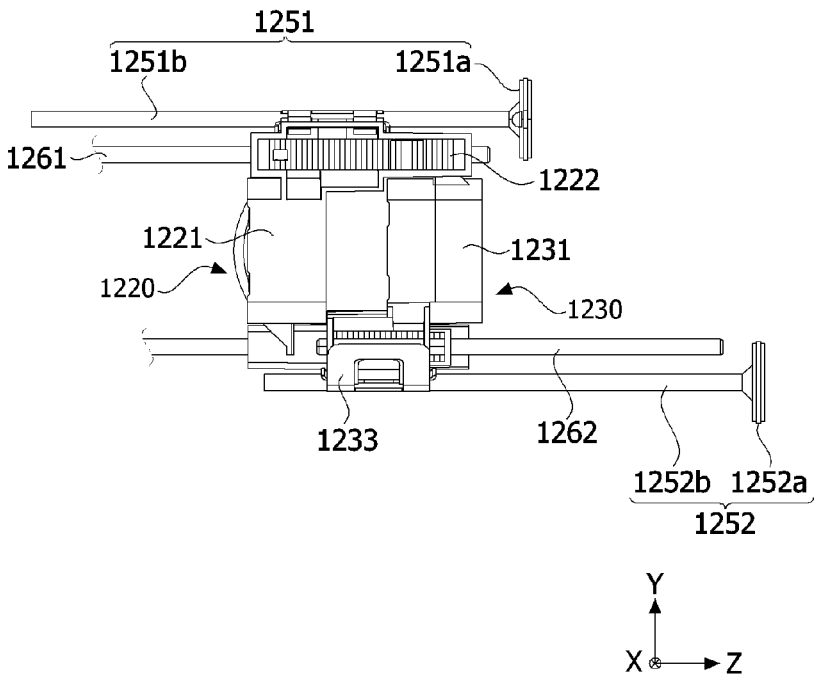
FIG. 16 is a bottom view of the first lens assembly, the second lens assembly, the guide pin, and the second driving unit according to the embodiment.
Figure 17:
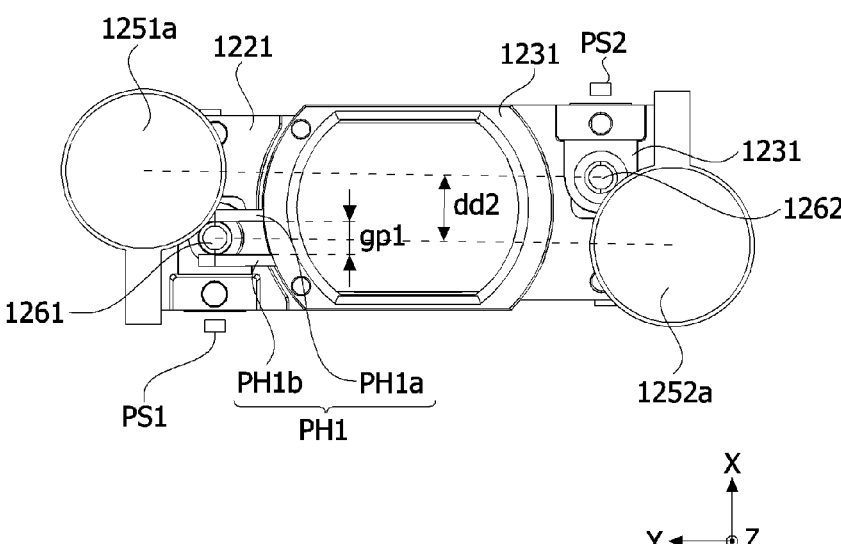
FIG. 17 is a rear view of the first lens assembly, the second lens assembly, the guide pin, and the second driving unit according to the embodiment.
Figure 18:
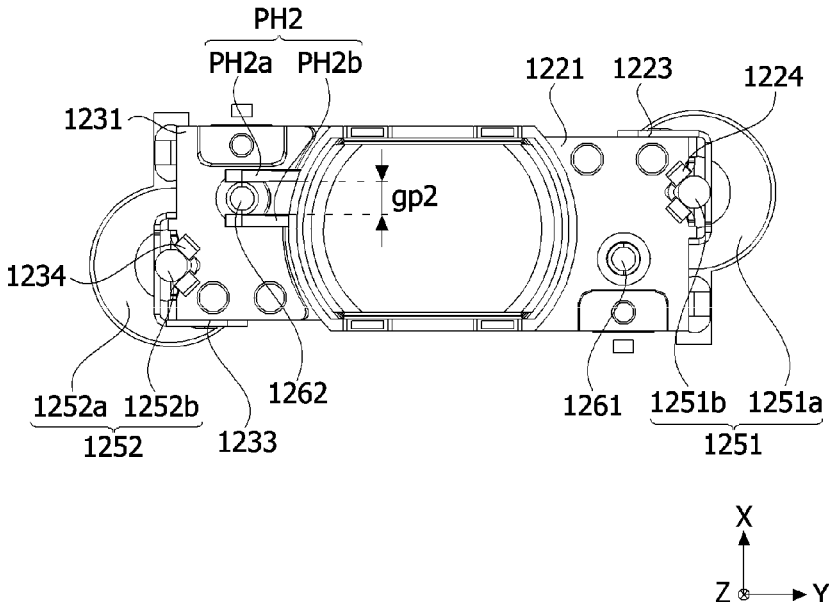
FIG. 18 is a front view of the first lens assembly, the second lens assembly, the guide pin, and the second driving unit according to the embodiment.
Figure 19:
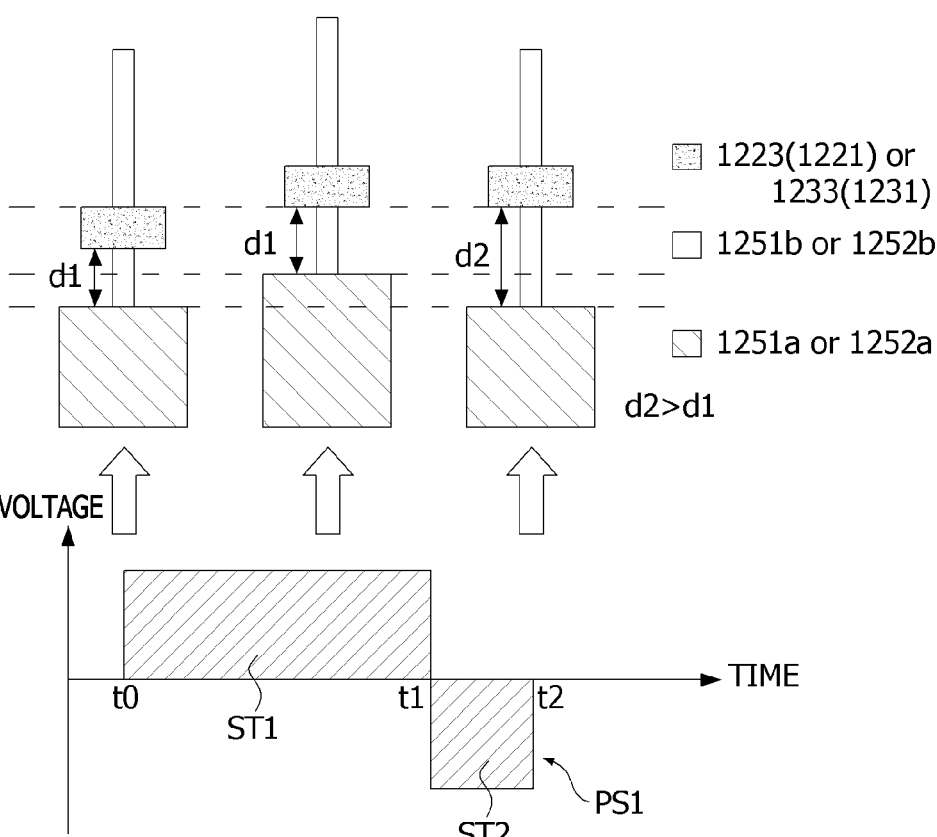
FIG. 19 is a view for describing forward movement of the second camera actuator by the second driving unit according to the embodiment.
Figure 20:
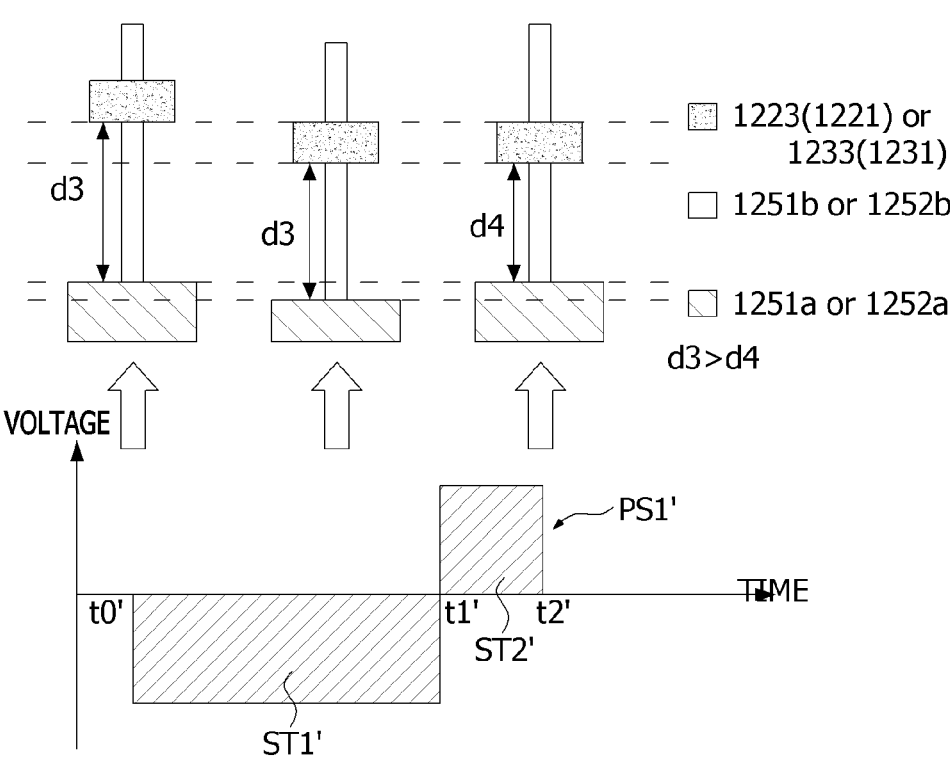
FIG. 20 is a view illustrating rearward movement of the second camera actuator by the second driving unit according to the embodiment.

FIG. 14 is a perspective view of a first lens assembly, a second lens assembly, a guide pin, and a second driving unit according to the embodiment, FIG. 15 is a top view of the first lens assembly, the second lens assembly, the guide pin, and the second driving unit according to the embodiment, FIG. 16 is a bottom view of the first lens assembly, the second lens assembly, the guide pin, and the second driving unit according to the embodiment, FIG. 17 is a rear view of the first lens assembly, the second lens assembly, the guide pin, and the second driving unit according to the embodiment, FIG. 18 is a front view of the first lens assembly, the second lens assembly, the guide pin, and the second driving unit according to the embodiment, FIG. 19 is a view for describing forward movement of the second camera actuator by the second driving unit according to the embodiment, and FIG. 20 is a view illustrating rearward movement of the second camera actuator by the second driving unit according to the embodiment.

Referring to FIGS. 14 to 18, the second driving unit 1250 according to the embodiment may include the first lens driving unit 1251 and the second lens driving unit 1252.

The first lens driving unit 1251 may include a first piezoelectric unit 1251a and a first rod 1251b. The first piezoelectric unit 1251a may be connected to the first rod 1251b. Therefore, the first piezoelectric unit 1251a shrinks or expands in the optical axis direction, and correspondingly, the first rod 1251b may also move in the optical axis direction or move a direction opposite to the optical axis direction.

Furthermore, the first lens assembly 1220 may include a first position magnet 1222 coupled to the first lens assembly 1220, and first elastic units 1223 and 1224 connected to the first rod 1251b and the first lens assembly.

The second lens driving unit 1252 may include a second piezoelectric unit 1252a and a second rod 1252b. The second piezoelectric unit 1252a may be connected to the second rod 1252b. Therefore, the second piezoelectric unit 1252a shrinks or expands in the optical axis direction, and correspondingly, the second rod 1252b may also move in the optical axis direction or move in a direction opposite to the optical axis direction.

Furthermore, the second lens assembly 1230 may include a second position magnet 1232 coupled to the second lens assembly 1230, and second elastic units 1233 and 1234 connected to the second rod 1252b and the second lens assembly.

In addition, the first elastic units 1223 and 1224 may include a first sub-elastic unit 1223 and a second sub-elastic unit 1224. The first sub-elastic unit 1223 and the second sub-elastic unit 1224 may face each other.

In addition, the second elastic unit may include a third sub-elastic unit 1233 and a fourth sub-elastic unit 1234. The third sub-elastic unit 1233 and the fourth sub-elastic unit 1234 may face each other.

Furthermore, in the second camera actuator according to the embodiment of the present invention, the first lens assembly 1220 may include a first lens barrel 1221, the first position magnet 1222, the first sub-elastic unit 1223, and the second sub-elastic unit 1224.

The first lens barrel 1221 may accommodate the first lens group as described above. In addition, the first position magnet 1222 may be seated on the first lens barrel 1221, and the first position magnet 1222 may also move in response to the movement of the first lens barrel 1221.

In addition, the first sub-elastic unit 1223 and the second sub-elastic unit 1224 may be connected to the first lens barrel 1221 and the first rod 1251*b* and may couple the first rod 1251*b* to the first lens barrel 1221. The first sub-elastic unit 1223 and the second sub-elastic unit 1224 may press the first rod 1251*b* in a state of being coupled to the first lens barrel 1221. In addition, the first sub-elastic unit 1223 and the second sub-elastic unit 1224 may come into contact with the first rod 1251*b*. Therefore, a friction force and an inertial force, which will be described below, are generated to allow the first lens assembly or the second lens assembly to move in the optical axis direction (Z-axis direction).

In addition, the second lens assembly 1230 may include a second lens barrel 1231, the second position magnet 1232, the third sub-elastic unit 1233, and the fourth sub-elastic unit 1234.

The second lens barrel 1231 may accommodate the second lens group as described above. In addition, the second position magnet 1232 may be seated on the second lens barrel 1231, and the second position magnet 1232 may also move in response to the movement of the second lens barrel 1231.

In addition, the third sub-elastic unit 1233 and the fourth sub-elastic unit 1234 may be connected to the second lens barrel 1231 and the second rod 1252*b* and may couple the second rod 1252*b* to the second lens barrel 1231. The third sub-elastic unit 1233 and the fourth sub-elastic unit 1234 may press the second rod 1252*b* in a state of being coupled to the second lens barrel 1231. In addition, the third sub-elastic unit 1233 and the fourth sub-elastic unit 1234 may come into contact with the second rod 1252*b*. Therefore, a friction force and an inertial force, which will be described below, are generated to allow the first lens assembly or the second lens assembly to move in the optical axis direction (Z-axis direction).

In addition, the first piezoelectric unit 1251*a* and the second piezoelectric unit 1252*a* may be electrically connected to the second board unit. Therefore, the first piezoelectric unit 1251*a* and the second piezoelectric unit 1252*a* may receive power. A circuit pattern and the like that supply power to the first piezoelectric unit 1251*a* and the second piezoelectric unit 1252*a* may be printed on the second board unit.

Furthermore, the first piezoelectric unit 1251*a* and the second piezoelectric unit 1252*a* may be connected to the second board unit. In addition, the first piezoelectric unit 1251*a* and the second piezoelectric unit 1252*a* may shrink or expand in the optical axis direction when a voltage is applied. The first piezoelectric unit 1251*a* and the second piezoelectric unit 1252*a* may be formed in a disk shape, but are not limited thereto. The first piezoelectric unit 1251*a* and the second piezoelectric unit 1252*a* may be made of piezoelectric ceramic.

The first piezoelectric unit 1251*a* and the second piezoelectric unit 1252*a* may be formed of various types of piezoelectric elements. The first piezoelectric unit 1251*a* and the second piezoelectric unit 1252*a* may be bimorph piezoelectric elements, but are not limited thereto.

In an embodiment, the first piezoelectric unit 1251*a* and the second piezoelectric unit 1252*a* may be formed of three layers. For example, the first piezoelectric unit 1251*a* and the second piezoelectric unit 1252*a* may each include a first piezoelectric element layer PL1, a second piezoelectric element layer PL2, and a central layer CE disposed between the first piezoelectric element layer PL1 and the second piezoelectric element layer PL2.

The first piezoelectric element layer PL1 and the second piezoelectric element layer PL2 may have piezoelectric properties and may be spaced apart from each other along the optical axis. The first piezoelectric element layer PL1 and the second piezoelectric element layer PL2 may be electrically connected. Therefore, the same voltage V1, which is one pole, may be applied. A specific voltage V2, which is the other pole, may be applied to the central layer CE interposed between both surfaces of the first piezoelectric element layer PL1 and the second piezoelectric element layer PL2.

For example, when the voltages V1 and V2 are applied to the first piezoelectric element layer PL1, the second piezoelectric element layer PL2, and the central layer CE, cation and anion in the first piezoelectric element layer PL1 and the second piezoelectric element layer PL2 may be aligned in a polarization direction from a random arrangement. In addition, when the (+, −) voltages are applied alternately to the first piezoelectric element layer PL1, the second piezoelectric element layer PL2, and the central layer CE connected in parallel, expanding and shrinking phenomena occur in the first piezoelectric unit 1251*a* and the second piezoelectric unit 1252*a*.

In other words, the first piezoelectric unit 1251*a* and the second piezoelectric unit 1252*a* may perform vibrations due to a variable frequency in a broad frequency range of 0 to 300 Hz, unlike a linear vibration motor, a VCM, or the like, due to the inherent characteristics of the piezoelectric method.

Therefore, in the second camera actuator according to the embodiment, by finely controlling a size and speed of vibrations by adjusting the frequency in a range of 0 to 300 Hz, it is possible to feel a delicate and simultaneous vibration effect fitted into a sound and image of a mobile terminal.

In addition, the central layer CE preferably uses a material with good electrical conductivity and elasticity. The first and second piezoelectric units of the present invention may be thin because they are used in electronic devices such as smartphones. Therefore, it is possible to make the camera actuator or camera module compact.

For example, although it is preferable that lead zirconate titanate (PZT) series piezoelectric ceramic be used for the first piezoelectric element layer PL1 and the second piezoelectric element layer PL2, the materials of the first piezoelectric element layer PL1 and the second piezoelectric element layer PL2 are not limited thereto.

In addition, when the first piezoelectric element layer PL1 and the second piezoelectric element layer PL2 are formed of only polycrystalline ceramic (Hard PZT), cracks are likely to occur when vibrations are caused by bending or when a product is dropped or impacted, and thus by forming the first piezoelectric element layer PL1 and the second piezoelectric element layer PL2 by selecting and using one of composite materials such as polyvinylidene fluoride (PZT-PVDF), PZT-silicon rubber, PZT-epoxy, or PZT-foamed polymer, and polymer materials such as PVDF, P(VDF-TrFE), P(VDF-TeFE), and TGS, it is possible to reduce the thickness and improve durability, thereby preventing the occurrence of cracks. However, the present invention is not limited to these materials as described above.

The first rod 1251*b* and the second rod 1252*b* may be coupled perpendicular to the first piezoelectric unit 1251*a* and the second piezoelectric unit 1252*a*. For example, the first rod 1251*b* and the second rod 1252*b* may extend in the optical axis direction.

In addition, the first rod 1251*b* and the second rod 1252*b* may move in a direction perpendicular to the first piezo-electric unit 1251*a* and the second piezoelectric unit 1252*a* according to the shrinkage or expansion of the first piezo-electric unit 1251*a* and the second piezoelectric unit 1252*a*. A driving force may be transmitted to the movable lens group assembly through the movement of the first rod 1251*b* and the second rod 1252*b*.

Position sensors PS1 and PS2 may be disposed to corre-spond to the position magnets. When a plurality of magnet scalers are provided, a plurality of sensors may also be provided. The sensor may be a two-dimensional (2D) or three-dimensional (3D) Hall sensor capable of measuring magnetic fields in two and three dimensions. However, the present invention is not limited to these types.

In addition, the first position sensor PS1 may be disposed opposite to the first position magnet 1222. The first position sensor PS1 may sense a position of the second lens assembly 1230 by measuring a magnetic field component from the magnetic field of the first position magnet 1222. The second position sensor PS2 may be disposed opposite the second position magnet 1232. The second position sensor PS2 may sense a position of the third lens assembly 1300 by mea-suring a magnetic field component from the magnetic field of the second position magnet 1232. For example, the first position magnet 1222 may be coupled to the first lens barrel 1221 and may be formed of a plurality of poles in which a plurality of N poles and a plurality of S poles are disposed sequentially and alternately. This can also be applied to the second position magnet 1232 in the same manner. In other words, the second position magnet 1232 may be coupled to the second lens barrel 1231 and may be formed of a plurality of poles in which a plurality of N poles and a plurality of S poles are disposed alternately.

According to one embodiment, the sensor may be dis-posed by being coupled to the housing of the camera module 100. According to another embodiment, the sensor may be disposed in a non-moving lens group assembly (i.e., a fixed group) included in the first camera actuator 1000. For example, when the first lens group assembly 1100 is a fixed group, the sensor may be disposed on the first lens group assembly 1100.

Furthermore, in an embodiment, the first piezoelectric unit 1251*a* may be disposed to be misaligned with the second piezoelectric unit 1252*a* in the optical axis direction (Z-axis direction). In addition, the first piezoelectric unit 1251*a* may be disposed to be spaced apart from the second piezoelectric unit 1252*a* in the optical axis direction (Z-axis direction).

In addition, a length L1 of the first rod 1251*b* in the optical axis direction (Z-axis direction) may be the same as or different from a length L2 of the second rod 1252*b* in the optical axis direction (Z-axis direction).

For example, the length L1 of the first rod 1251*b* in the optical axis direction (Z-axis direction) may differ from the length L2 of the second rod 1252*b* in the optical axis direction (Z-axis direction). However, portions of the first rod 1251*b* and the second rod 1252*b* may overlap each other in the second direction (Y-axis direction), and the remaining portions thereof may not overlap each other.

The first guide pin 1261 and the second guide pin 1262 may have lengths L3 and L4 of the first rod 1251*b* in the optical axis direction (Z-axis direction) that are larger than the lengths L1 and L2 of the second rod 1252*b* in the optical axis direction (Z-axis direction).

The first guide pin 1261 may pass through the first lens barrel 1221 in the first lens assembly 1220. In addition, the second guide pin 1262 may pass through the second lens barrel 1231 in the second lens assembly 1230. Furthermore, the first guide pin 1261 and the second guide pin 1262 may extend in the optical axis direction (Z-axis direction).

In addition, the first guide pin 1261 may pass through the first lens barrel 1221 and include first pin holders PH1*a* and PH1*b* having a groove or separation gap gp1 in the second lens barrel 1231.

In addition, the second guide pin 1262 may pass through the second lens barrel 1231 and include second pin holders PH2*a* and PH2*b* having a groove or separation gap gp2 in the first lens barrel 1221.

The second guide pin 1262 may be positioned in the separation gap gp1 of the first pin holders PH1*a* and PH1*b* to reduce optical axis distortion between the first lens group of the first lens assembly and the second lens group of the second lens assembly. The first pin holders PH1*a* and PH1*b* may surround at least a portion of the second guide pin 1262.

In addition, the first guide pin 1261 may be positioned in the separation gap gp2 of the second pin holders PH2*a* and PH2*b* to reduce optical axis distortion between the first lens group of the second lens assembly and the second lens group of the second lens assembly. In addition, the second pin holders PH2*a* and PH2*b* may surround at least a portion of the first guide pin 1261.

In addition, the first rod 1251*b* may move the first elastic units 1223 and 1224 or the first lens barrel (or the first lens assembly) with an inertia or friction force as described in the present specification by vibrating in the optical axis direc-tion due to the vibrations of the first piezoelectric unit 1251*a*. Likewise, the second rod 1252*b* may move the second elastic units 1233 and 1234 or the second lens barrel (or the first lens assembly) with an inertia or friction force as described in the present specification by vibrating in the optical axis direction due to the vibrations of the second piezoelectric unit 1252*a*.

However, the first rod 1251*b* and the second rod 1252*b* may have an ineffective area IA, which is an area adjacent to the piezoelectric units (the first piezoelectric unit and the second piezoelectric unit) connected thereto, and an effec-tive area AA, which is an area disposed farther than the ineffective area.

First, it is possible to minimize the area (corresponding to the ineffective area to be described below) in which the lens assembly does is not moved by the first and second piezo-electric units 1251*a* and 1252*a* in the first and second rods 1251*b* and 1252*b*.

In the ineffective area IA, each of the first and second lens assemblies may not be moved by the vibrations of the piezoelectric unit caused by a load due to the above-described inertia or friction force. In contrast, in the effective area, each of the first and second lens assemblies may be moved in the optical axis direction by the vibrations of the piezoelectric unit.

Furthermore, in the second camera actuator according to the present embodiment, as described above, the lengths of the first rod 1251*b* and the second rod 1252*b* in the optical axis direction may be reduced, thereby reducing the ineffective area. Therefore, it is possible to reduce the length and weight of the second camera actuator and make the size compact, thereby improving driving efficiency.

Furthermore, the first sub-elastic unit 1223 and the second sub-elastic unit 1224 may face each other, and the first rod 1251*b* may be positioned between the first sub-elastic unit 1223 and the second sub-elastic unit 1224. In addition, the third sub-elastic unit 1233 and the fourth sub-elastic unit 1244 may face each other, and the second rod 1252*b* may be positioned between the third sub-elastic unit 1233 and the fourth sub-elastic unit 1244.

Further referring to FIG. 19, the piezoelectric units (corresponding to the first and second piezoelectric units) may expand and shrink according to the applied voltage. For example, the piezoelectric unit may expand (F1*aa* in FIG. 15) when the applied voltage increases and shrink (Flab in FIG. 15) when the applied voltage decreases.

The expansion and shrinkage of the piezoelectric unit may be adjusted according to the first driving signal PS1, and the positions of the elastic units (corresponding to the first and second elastic units) may be changed on the rods (corresponding to the first and second rods).

For example, when the voltage is applied for a predetermined time (from t0 to t1) and a pressing unit and the rod expand at a predetermined speed or less, the position of the elastic unit may be the same on the rod. In other words, a distance d1 between the elastic unit and the pressing unit may be maintained.

However, when the voltage is applied for a predetermined time (from t1 to t2) and the pressing unit and the rod shrink at a speed higher than a predetermined speed, the position of the elastic unit may be changed on the rod. The total voltage ST2 applied for the time (from t1 to t2) may be equal to the total voltage ST1 applied for the time (from t0 to t1). For example, a magnitude of the voltage may be larger for the time (from t1 to t2) than for the time (from t0 to t1). This may change depending on the piezoelectric unit. Hereinafter, when a positive (+) voltage is applied to the piezoelectric unit, the length of the piezoelectric unit increases in the third direction (Z-axis direction), and when a negative (−) voltage is applied to the piezoelectric unit, the length of the piezoelectric unit decreases in the third direction (Z-axis direction).

Therefore, the position of the elastic unit may be maintained by inertia so that a relative position on the rod may be the same as an expanding direction. In other words, the distance between the elastic unit and the pressing unit may increase (increase from d1 to d2). In other words, finally, the first lens barrel may move in the third direction by increasing the position (separation distance) between the piezoelectric unit and the elastic unit even when the length of the piezoelectric unit is the same due to the application of the first driving signal PS1.

This first driving signal PS1 may be repeatedly applied several times for a predetermined time. For example, the first driving signal may be applied to the piezoelectric unit repeatedly 100 times per second. Therefore, the first driving signal for one cycle may move the first elastic unit in the third direction.

Further referring to FIG. 20, the expansion and shrinkage of the piezoelectric unit may be adjusted according to a second driving signal PS1', and the positions of the elastic units (corresponding to the first and second elastic units) may be changed on the rods (corresponding to the first and second rods).

For example, when the voltage is applied for a predetermined time (from t0' to t1') and the pressing unit and the rod shrink at a predetermined speed or less, the position of the elastic unit may be the same on the rod. In other words, a distance d3 between the elastic unit and the pressing unit may be maintained. However, when the voltage is applied for a predetermined time (from t1' to t2') and the pressing unit and the rod expand at a speed higher than the predetermined speed, the position of the elastic unit may be changed on the rod. The total voltage ST2' applied for the time (from t1' to t2') may be equal to the total voltage ST1' applied for the time (from t0' to t1'). For example, a magnitude of the voltage may be larger for the time (from t1' to t2') than for the time (from t0' to t1'). This may change depending on the piezoelectric unit as described above.

Therefore, the position of the elastic unit may be maintained by inertia so that a relative position on the rod may be a position in an expanding direction. In other words, the distance between the elastic unit and the pressing unit may decrease (decrease from d3 to d4). In other words, finally, the second lens barrel may move in a direction opposite to the third direction so that the position between the piezoelectric unit and the second lens barrel decreases even when the final length of the piezoelectric unit is the same due to the application of a second driving signal PS1'.

This second driving signal PS1' may be repeatedly applied several times for a predetermined time. For example, the second driving signal may be applied to the piezoelectric unit repeatedly 100 times per second. Therefore, the second driving signal for one cycle may move the first elastic unit in the third direction to press the rotating unit and perform a yaw tilting.

Figure 21:
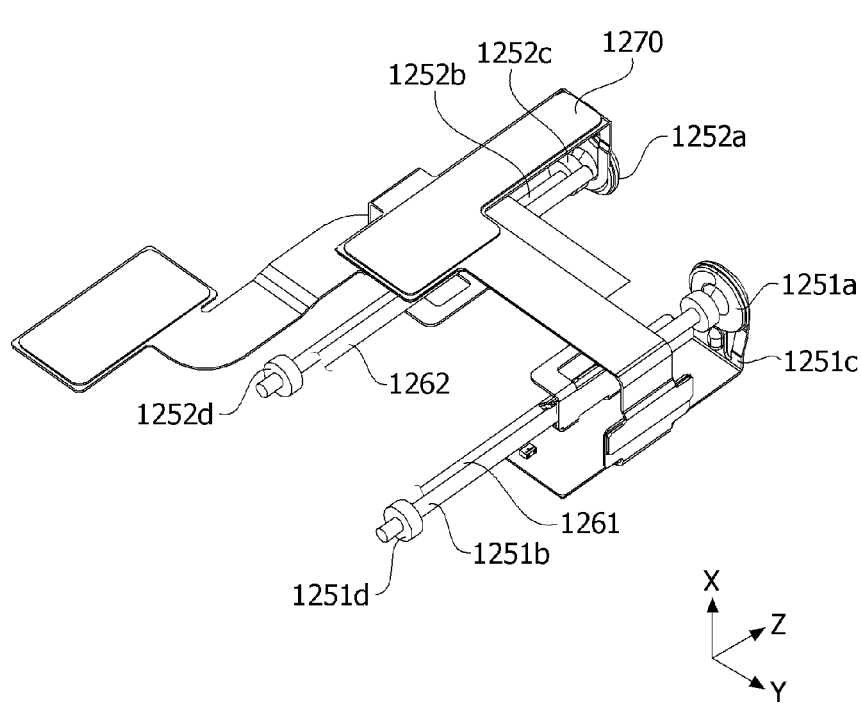
FIG. 21 is a perspective view of the first lens assembly, the second lens assembly, the guide pin, the second driving unit, and a second board unit according to the embodiment.
Figure 22:
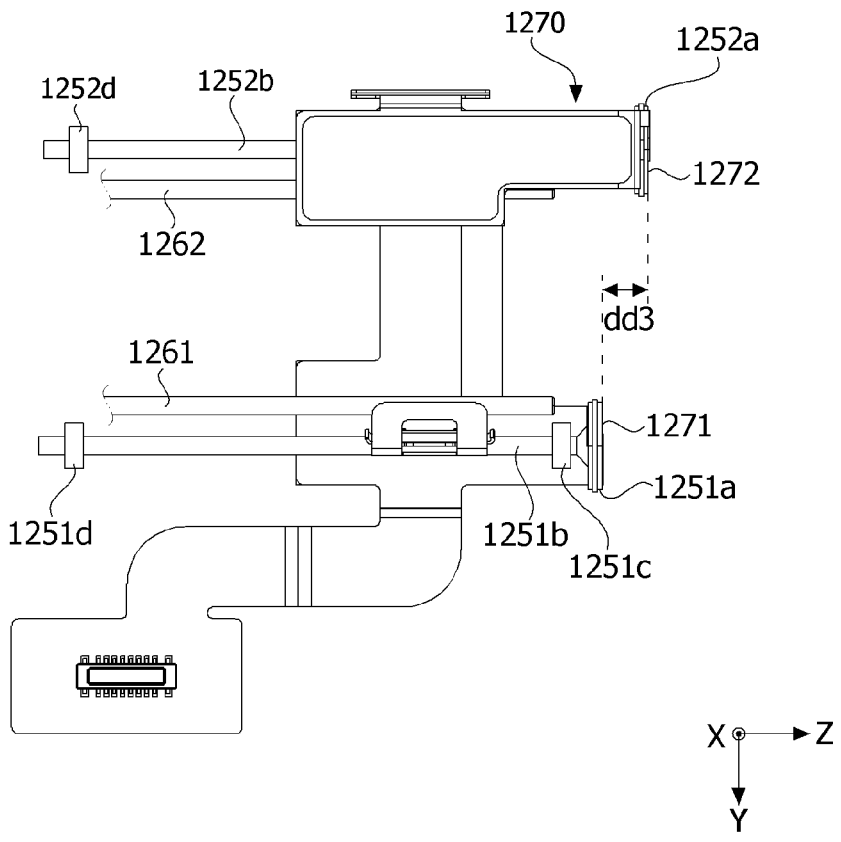
FIG. 22 is a top view of the first lens assembly, the second lens assembly, the guide pin, the second driving unit, and the second board unit according to the embodiment.
Figure 23:
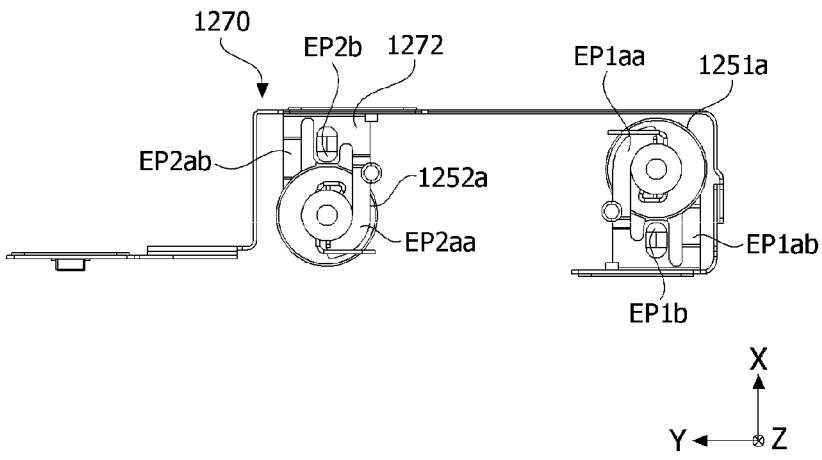
FIG. 23 is a front view of the first lens assembly, the second lens assembly, the guide pin, the second driving unit, and the second board unit according to the embodiment.
Figure 24:
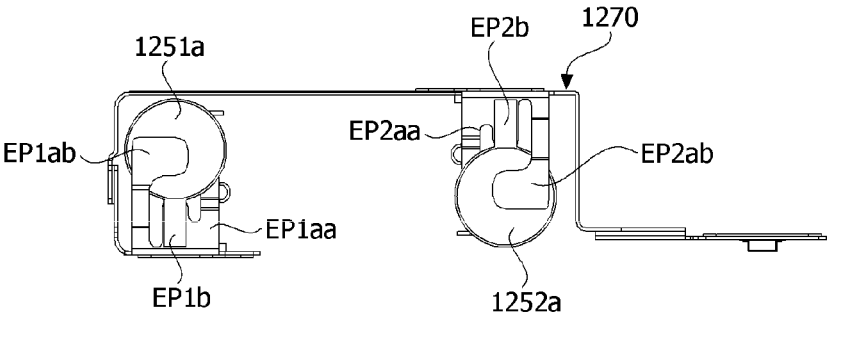
FIG. 24 is a rear view of the first lens assembly, the second lens assembly, the guide pin, the second driving unit, and the second board unit according to the embodiment.

FIG. 21 is a perspective view of the first lens assembly, the second lens assembly, the guide pin, the second driving unit, and a second board unit according to the embodiment, FIG. 22 is a top view of the first lens assembly, the second lens assembly, the guide pin, the second driving unit, and the second board unit according to the embodiment, FIG. 23 is a front view of the first lens assembly, the second lens assembly, the guide pin, the second driving unit, and the second board unit according to the embodiment, and FIG. 24 is a rear view of the first lens assembly, the second lens assembly, the guide pin, the second driving unit, and the second board unit according to the embodiment.

Referring to FIGS. 21 to 24, the first lens driving unit 1251 according to the embodiment may include the first piezoelectric unit 1251*a* and the first rod 1251*b* and further include first coupling members 1251*c* and 1251*d*. The first coupling members 1251*c* and 1251*d* may be provided in plural and may come into contact with inner surfaces or outer surfaces of a third side surface and a fourth side surface of the base. Alternatively, any one of the first coupling members 1251*c* and 1251*d* may come into contact with an inner surface or outer surface of a facing surface of the third lens assembly in the optical axis direction. When the first rod 1251*b* shrinks and expands in the optical axis direction, the first coupling members 1251*c* and 1251*d* may allow the first rod 1251*b* to be coupled to the base, the first lens assembly, or the third lens assembly. Furthermore, the first coupling members 1251*c* and 1251*d* may be made of an elastic material.

Correspondingly, the second lens driving unit 1252 according to the embodiment may include the second piezoelectric unit 1252*a* and the second rod 1252*b* and further include second coupling members 1252*c* and 1252*d*. The second coupling members 1252*c* and 1252*d* may be provided in plural and may come into contact with the inner surfaces or outer surfaces of the third side surface and the fourth side surface of the base. Alternatively, any one of the second coupling members 1252*c* and 1252*d* may come into contact with the inner surface or outer surface of the facing surface of the third lens assembly in the optical axis direction. When the second rod 1252*b* shrinks and expands in the optical axis direction, the second coupling members 1252*c* and 1252*d* may allow the second rod 1252*b* to be coupled to the base, the second lens assembly, or the third lens assembly. Furthermore, the second coupling members 1252*c* and 1252*d* may be made of an elastic material.

Therefore, the first rod 1251*b* and the second rod 1252*b* may vibrate at the above-described predetermined frequency in the optical axis direction. At this time, the first rod 1251*b* and the second rod 1252*b* may vibrate in the optical axis direction by several micrometers, preferably, tens of nanometers or less. The first coupling member and the second coupling member can suppress damage to the base and the first lens assembly to the third lens assembly due to the vibrations of the first rod 1251*b* and the second rod 1252*b*.

In addition, the second board unit 1270 may be disposed on the base upper surface or rear surface of the base as described above and may be electrically connected to the first piezoelectric unit 1251*a* and the second piezoelectric unit 1252*a* in some areas.

For example, the first board unit 1270 may be bent in the first direction at the base upper surface or base rear surface of the base. Therefore, the first board unit 1270 may include a first board area 1271 in which the first piezoelectric unit 1251*a* is seated or which is electrically connected to the first piezoelectric unit 1251*a*. In addition, the first board unit 1270 may include a second board area 1272 in which the second piezoelectric unit 1252*a* is seated or which is electrically connected to the second piezoelectric unit 1252*a*. The first board area 1271 and the second board area 1272 may extend in the first direction (X-axis direction).

Furthermore, the first board area 1271 may include first electrode units EP1*aa* and EP1*ab* connected to the first piezoelectric element layer and the second piezoelectric element layer of the first piezoelectric unit 1251*a*, and a second electrode unit EP1*b* connected to the central layer.

In addition, the second board area 1272 may include third electrode units EP2*aa* and EP2*ab* connected to the first piezoelectric element layer and the second piezoelectric element layer of the second piezoelectric unit 1252*a*, and a fourth electrode unit EP2*b* connected to the central layer.

Furthermore, a portion of the second board unit 1270 may extend to the outside of the second camera actuator or the like and include a connector. In addition, the second board unit 1270 may be electrically connected to a processor or control unit of the electronic device through the connector.

Figure 25:
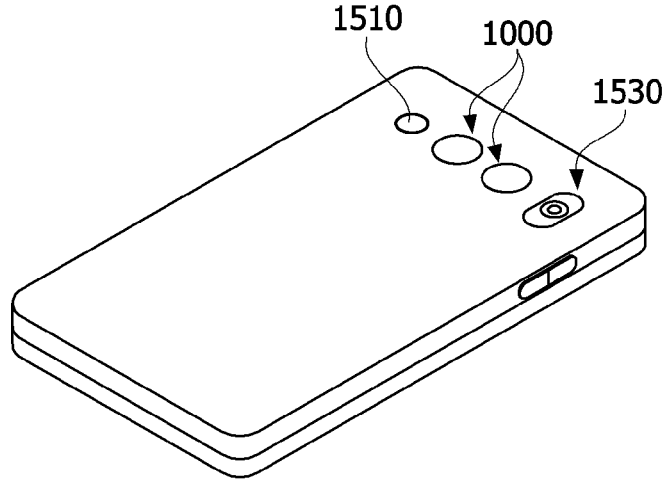
FIG. 25 is a perspective view of a mobile terminal to which the camera module according to the embodiment is applied.

FIG. 25 is a perspective view of a mobile terminal to which the camera module according to the embodiment is applied.

Referring to FIG. 25, a mobile terminal 1500 according to the embodiment may include the camera module 1000, a flash module 1530, and an AF device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display and stored in a memory. A camera (not illustrated) may also be disposed on a front surface of a body of the mobile terminal.

For example, the camera module 1000 may include the above-described camera module. In addition, the camera module 1000 may include the first camera module and the second camera module, and the first camera module may enable OIS implementation together with the AF or zooming function.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition that the AF function using the image of the camera module 1000 is degraded, for example, a proximity of 10 m or less or dark environment.

The AF device 1510 may include a light emitting unit including a vertical cavity surface emitting laser (VCSEL) semiconductor device and a light receiving unit for converting light energy into electrical energy, such as a photodiode.

Figure 26:
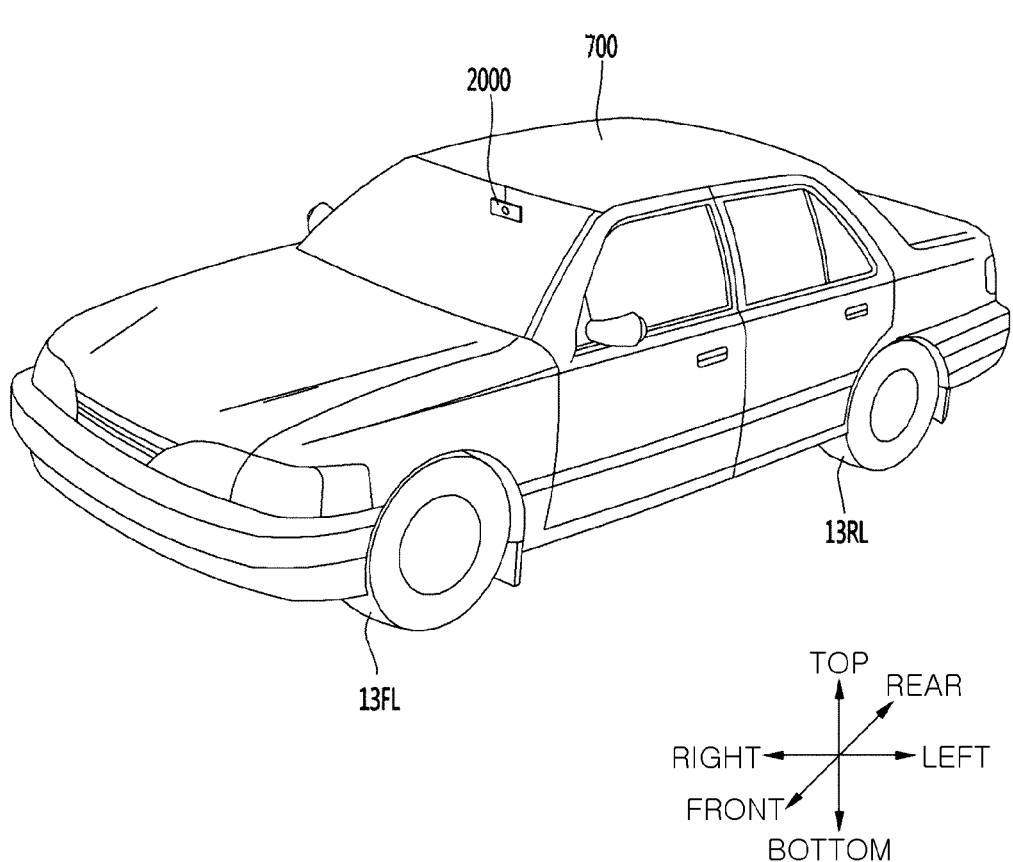
FIG. 26 is a perspective view of a vehicle to which the camera module according to the embodiment is applied.

FIG. 26 is a perspective view of a vehicle to which the camera module according to the embodiment is applied.

For example, FIG. 26 is an external view illustrating the vehicle including a vehicle driving assistance device to which the camera module 1000 according to the embodiment is applied.

Referring to FIG. 26, a vehicle 700 according to the embodiment may include wheels 13FL and 13FR rotated by a power source and a predetermined sensor. Although the sensor may be a camera sensor 2000, the present invention is not limited thereto.

The camera 2000 may be a camera sensor to which the camera module 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, although the camera sensor 2000 may include a stereo camera in order to improve the measurement accuracy of the object and further secure information such as a distance between the vehicle 700 and the object, the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator comprising:

a base;

a first lens assembly and a second lens assembly disposed sequentially in an optical axis direction in the base; and a driving unit configured to move the first lens assembly and the second lens assembly, wherein the driving unit includes a first lens driving unit configured to move the first lens assembly and a second lens driving unit configured to move the second lens assembly, wherein the first lens driving unit includes a first piezoelectric unit, wherein the second lens driving unit includes a second piezoelectric unit, wherein the first piezoelectric unit and the second piezoelectric unit are each configured to shrink and expand in the optical axis direction, wherein the first piezoelectric unit is disposed to be misaligned with the second piezoelectric unit in the optical axis direction, wherein the first lens driving unit further includes a first rod connected to the first piezoelectric unit, wherein the first lens assembly further includes a first elastic unit connected to the first rod, wherein the second lens driving unit further includes a second rod connected to the second piezoelectric unit, wherein the second lens assembly further includes a second elastic unit connected to the second rod, wherein the first elastic unit includes a first sub-elastic unit and a second sub-elastic unit facing each other, and wherein the second elastic unit includes a third sub-elastic unit and a fourth sub-elastic unit facing each other.

2. The camera actuator of claim 1, wherein the first piezoelectric unit is disposed to be spaced apart from the second piezoelectric unit in the optical axis direction.

3. The camera actuator of claim 1, wherein the first sub-elastic unit and the second sub-elastic unit come into contact with the first rod, and the third sub-elastic unit and the fourth sub-elastic unit come into contact with the second rod.

4. The camera actuator of claim 1, wherein a length of the first rod in the optical axis direction is the same as or different from a length of the second rod in the optical axis direction.

5. The camera actuator of claim 1, further comprising a guide unit passing through any one of the first lens assembly and the second lens assembly, wherein the guide unit includes:

a first guide pin passing through the first lens assembly; and a second guide pin passing through the second lens assembly.

6. The camera actuator of claim 5, wherein lengths of the first guide pin and the second guide pin in the optical axis direction are larger than lengths of the first rod and the second rod in the optical axis direction.

7. The camera actuator of claim 5, wherein the first lens assembly includes a first pin holder surrounding at least a portion of the second guide pin, and the second lens assembly includes a second pin holder surrounding at least a portion of the first guide pin.

8. A camera actuator comprising:

a base;

a first lens assembly and a second lens assembly disposed sequentially in an optical axis direction in the base; and a driving unit configured to move the first lens assembly and the second lens assembly, wherein the driving unit includes a first lens driving unit configured to move the first lens assembly and a second lens driving unit configured to move the second lens assembly, wherein the first lens driving unit includes a first piezoelectric unit, wherein the second lens driving unit includes a second piezoelectric unit, wherein the first piezoelectric unit is disposed to be misaligned with the second piezoelectric unit in the optical axis direction, wherein the first lens driving unit further includes a first rod connected to the first piezoelectric unit, wherein the first lens assembly further includes a first elastic unit connected to the first rod, wherein the second lens driving unit further includes a second rod connected to the second piezoelectric unit, wherein the second lens assembly further includes a second elastic unit connected to the second rod, wherein the first elastic unit includes a first sub-elastic unit and a second sub-elastic unit facing each other, and wherein the second elastic unit includes a third sub-elastic unit and a fourth sub-elastic unit facing each other.

9. The camera actuator of claim 8, wherein the first piezoelectric unit is disposed to be spaced apart from the second piezoelectric unit in the optical axis direction.

10. The camera actuator of claim 8, wherein the first sub-elastic unit and the second sub-elastic unit come into contact with the first rod, and the third sub-elastic unit and the fourth sub-elastic unit come into contact with the second rod.

11. The camera actuator of claim 8, wherein a length of the first rod in the optical axis direction is the same as or different from a length of the second rod in the optical axis direction.

12. The camera actuator of claim 8, further comprising a guide unit passing through any one of the first lens assembly and the second lens assembly, wherein the guide unit includes:

a first guide pin passing through the first lens assembly; and a second guide pin passing through the second lens assembly.

13. The camera actuator of claim 12, wherein lengths of the first guide pin and the second guide pin in the optical axis direction are larger than lengths of the first rod and the second rod in the optical axis direction.

14. The camera actuator of claim 12, wherein the first lens assembly includes a first pin holder surrounding at least a portion of the second guide pin, and the second lens assembly includes a second pin holder surrounding at least a portion of the first guide pin.

\* \* \* \* \*